United States Patent

Miyauchi et al.

(10) Patent No.: US 7,136,230 B2
(45) Date of Patent: Nov. 14, 2006

(54) IMAGE PICKUP SYSTEM

(75) Inventors: Yuji Miyauchi, Machida (JP); Noriyuki Iyama, Hachioji (JP); Yuko Kobayashi, Hachioji (JP); Katsuhiro Takada, Hidaka (JP); Takanori Yamanashi, Kokubunji (JP)

(73) Assignee: Olympus Corporation, Tokyo (JP)

( * ) Notice: Subject to any disclaimer, the term of this patent is extended or adjusted under 35 U.S.C. 154(b) by 951 days.

(21) Appl. No.: 10/050,881

(22) Filed: Jan. 18, 2002

(65) Prior Publication Data

US 2002/0154415 A1 Oct. 24, 2002

(30) Foreign Application Priority Data

Jan. 18, 2001 (JP) .............................. 2001-009950

(51) Int. Cl.
G02B 13/22 (2006.01)

(52) U.S. Cl. ...................... 359/663; 359/676; 359/680; 359/686; 359/689; 359/691; 348/240.99; 348/240.3

(58) Field of Classification Search ................ 359/663, 359/676, 680, 686, 689, 691, 740; 348/240.99, 348/240.3, 335, 340
See application file for complete search history.

(56) References Cited

U.S. PATENT DOCUMENTS

| | | | | |
|---|---|---|---|---|
| 5,071,237 | A | * | 12/1991 | Braat et al. .................. 359/686 |
| 6,124,984 | A | | 9/2000 | Shibayama et al. ......... 359/687 |
| 6,185,048 | B1 | | 2/2001 | Ishii ............................. 359/687 |
| 6,308,011 | B1 | | 10/2001 | Wachi et al. .................. 396/72 |
| 6,331,917 | B1 | | 12/2001 | Ishii et al. ................... 359/687 |
| 2002/0057502 | A1 | | 5/2002 | Ishii et al. ................... 359/687 |

FOREIGN PATENT DOCUMENTS

| | | |
|---|---|---|
| EP | 1 093 000 | 4/2001 |
| JP | 05-347730 | 12/1993 |
| JP | 06-153066 | 5/1994 |
| JP | 10-148754 | 6/1998 |
| JP | 11-008803 | 1/1999 |
| JP | 2000-244799 | 9/2000 |
| JP | 2000-267009 | 9/2000 |
| JP | 2000-275520 | 10/2000 |

\* cited by examiner

*Primary Examiner*—Hung Xuan Dang
*Assistant Examiner*—Joseph Martinez
(74) *Attorney, Agent, or Firm*—Kenyon & Kenyon LLP

(57) ABSTRACT

The invention relates to an electronic image pickup system that enables a wide image-pickup, and ensures that even when an image is printed, sufficient image quality and clearness are obtained from the center to as far as the margin of the image and the image of a subject is depicted with a sense of extension. The electronic image pickup system comprises an image-formation optical system 10 for forming an image of a subject and an electronic image pickup device 20 located on an image side of the image-formation optical system for obtaining image information on the image. The angle between the farthest-off-axis chief ray incident on the farthest off-axis site on an image pickup plane of the electronic image pickup device and an axial chief ray incident on the center of the image pickup plane satisfies condition (1) for determining the angle of view suitable to obtain the sense to extension demanded for landscape photography and sharpness all over the image and condition (2) for allowing a light bundle incident on the image pickup device to be substantially vertically incident on the image pickup plane. The image pickup device 20 satisfies condition (3) for determining the effective number of pixels on the image pickup device or the maximum number of recording pixels by signal processing.

17 Claims, 12 Drawing Sheets

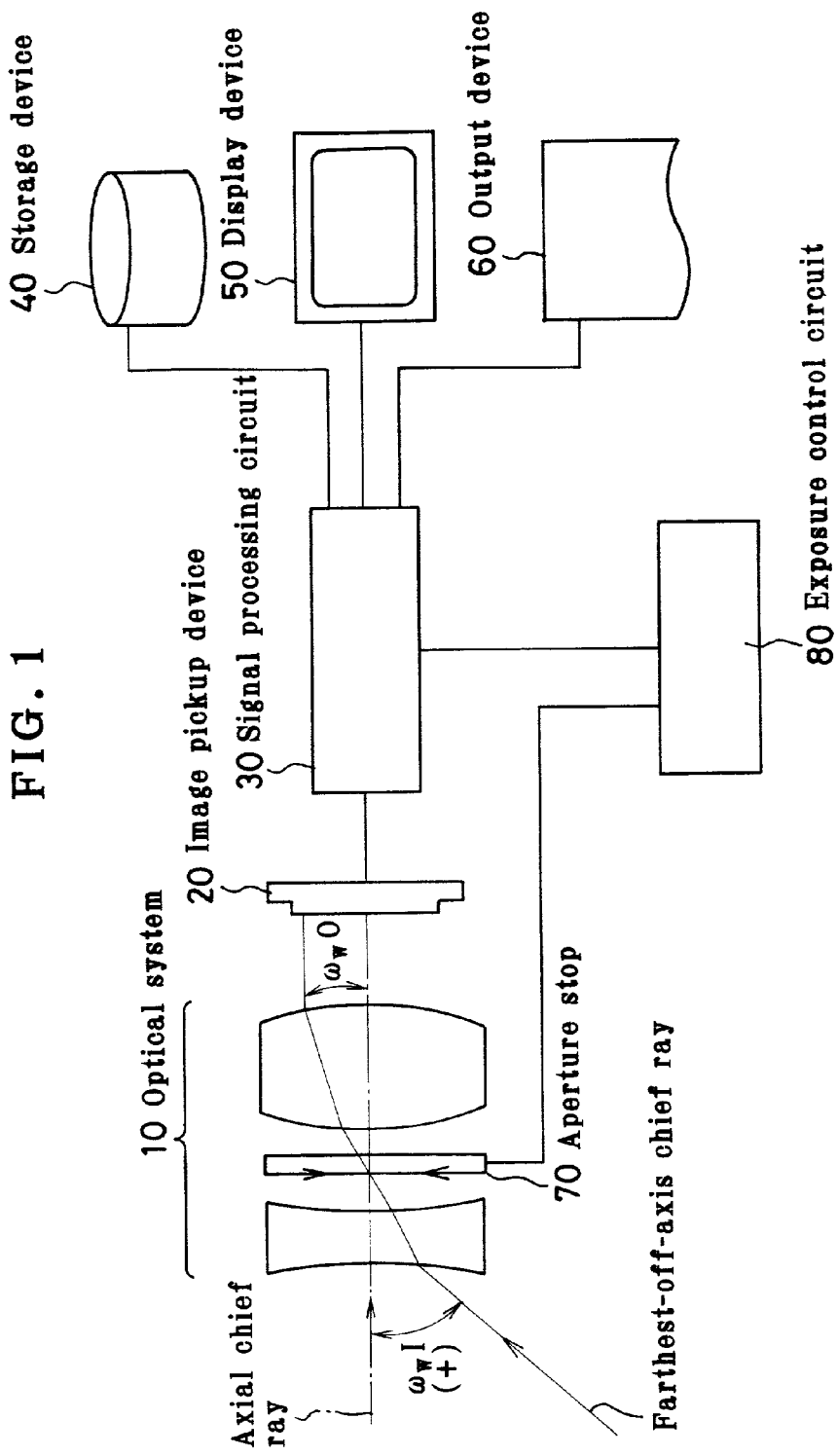

Effective image pickup plane

Effective image pickup plane

Effective image pickup plane

Spatial frequency (lines/mm)

Spatial frequency (lines/mm)

Spatial frequency (lines/mm)

Spatial frequency (lines/mm)

IMAGE PICKUP SYSTEM

This application claims benefit of Japanese Patent Application No. 2001-9950 filed in Japan on Jan. 18, 2001, the contents of which are incorporated by this reference.

BACKGROUND OF THE INVENTION

The present invention relates to an image pickup system using an electronic image pickup device for obtaining electronic images.

There are available digital cameras or other like image pickup systems wherein an image obtained through an image-formation optical system is converted by an electronic image pickup device such as a CCD into image information, and the image is reproduced for observation on a monitor or printer on the basis of that image information. Currently available digital cameras are of various types from the inexpensive low-end type to the high-end type equipped with sophisticated functions.

Of these, the low-end types are designed to be compatible with a human's general range of field of view, and have a zoom type image-formation optical system capable of covering as far as a medium or telephoto range.

In models corresponding to the high-end types, on the other hand, making use of interchangeable lenses designed for silver-salt cameras is now in vogue, with CCDs located at image positions.

A high-end digital camera of the type with a zoom lens of high magnification incorporated as an image-formation optical system is also available with an image pickup range where a human's general range of field of view is defined as the wide-angle end.

With a digital camera of the low-end type or the type using a zoom lens of high magnification, however, any ample field of view is not obtained even at the wide-angle end in the photographable angle of view. Thus, such a digital camera is not suitable for photographing extensive, profound subjects such as landscapes.

If a wide-conversion lens to obtain a focal length shorter than that at the wide-angle end is mounted on a taking lens, it may be possible to photograph a wide-angle range. However, this leads to severe degradation of the image-formation capability of an optical system. When a low-end digital camera is used to photograph a wide range of landscapes or the like having high spatial frequencies, it is impossible to provide any satisfactory reproduction of such spatial frequencies because a CCD mounted on the digital camera is insufficient in respect of the number of pixels. In addition, when the image is enlarged and printed to general appreciation size, the resulting image quality is unsuitable for appreciation purposes.

With a high-end digital camera capable of interchanging lenses, a wide extent of subjects may be prima facie photographed when a so-called wide-angle lens or ultra-wide-angle lens is selected from interchangeable lenses. However, these lenses are designed on the premise that they are used with silver-salt films; the angle of incidence of light on the periphery of a CCD is large, ending up with degradation of images.

Thus, when existing digital cameras are used to photograph subjects of high spatial frequencies such as landscapes, it is difficult to obtain clear-cut images all over the range to be photographed. In addition, not only is definition less than satisfactory but also no sufficient image quality is obtained on the periphery of the image-pickup plane. Especially when the image is enlarged and printed to appreciation size, the unclearness of the image becomes noticeable; the quality of the image does not reach that of a silver-salt photograph at all.

JP-A 05-347730 discloses a method for subjecting an image to so-called edge enhancement processing, thereby giving apparent sharpness to the image. Most of image pickup systems now on the consumer-oriented market, too, make use of such edge enhancement processing and so appear to succeed in achieving sharp images. As far as electrical processing is concerning, edge enhancement may be applied to an image with no substantial restrictions. However, an image subjected to unreasonable enhancement processing undergoes too much degradation upon some considerable enlargement. Accordingly, the level of edge enhancement should preferably be reduced as much as possible so as to achieve high-definition images. In this regard, too, the image quality achieved with existing consumer-oriented image pickup systems is still quite inferior to that of silver-salt photographs at all.

SUMMARY OF THE INVENTION

In view of such problems as mentioned above, an object of the invention is to provide an electronic image pickup system that enables a wide image-pickup range without recourse to any conversion lens, and ensures that even when an image obtained by photographing a landscape or the like having a high spatial frequency is enlarged and printed to appreciation size, sufficient image quality and clearness are obtained from the center to as far as the margin of the image and the image of a subject is reproduced with a sense of extension.

According to the first aspect of the invention, this object is accomplished by the provision of an image pickup system comprising an image-formation optical system for forming an image of a subject and an electronic image pickup device located on an image side of said image-formation optical system for obtaining image information on said image, wherein:

an angle between the farthest-off-axis chief ray incident on the farthest off-axis site on an image pickup plane of said electronic image pickup device and an axial chief ray incident on the center of said image pickup plane satisfies the following conditions (1) and (2), and said image pickup device satisfies the following condition (3):

$$36° < \omega_{w1} < 60° \quad (1)$$

$$-15° \leq \omega_{w0} < 10° \quad (2)$$

$$3.5 < N < 20 \text{ (in million)} \quad (3)$$

Here $\omega_{w1}$ is the angle between the direction of incidence of said axial chief ray and the direction of incidence of said farthest-off-axis chief ray on the entrance plane of said image-formation optical system or, alternatively, at the wide-angle end when said image-formation optical system is a zoom optical system, $\omega_{w0}$ is the angle between the direction of emergence of said axial chief ray and the direction of emergence of said farthest-off-axis chief ray on the exit plane of said image-formation optical system or, alternatively, at the wide-angle end when said image-formation optical system is a zoom optical system with the proviso that the sign for the direction of emergence of light away from an optical axis thereof is negative, and N is the effective number of pixels of said electronic image pickup device (in million) or the maximum number of recording pixels by signal processing (in million).

How the first image pickup system works is now explained.

The specific object of the invention is to achieve an electronic image pickup system which ensures such a wide angle of view and high image quality as needed for landscape photographs, and can yield a landscape photograph comparable to a silver-salt photograph even when it is enlarged and printed to appreciation size.

First of all, an account is given of the taking angle of view needed for landscape photography.

A human's normal visual field is about 50° in terms of total visual field, but becomes wide to about 70° in a relaxed condition. In a much wider visual field, the viewer can have a much wider vision. Thus, a half angle of view of at least 36° is preferable for photographing landscapes.

Being part of the premise of the invention, condition (1) is provided to determine the angle of view suitable for obtaining the sense of extension and the sense of sharpness all over the image size—needed for landscape photography. When the lower limit of 36° to condition (1) is not reached, it is difficult to obtain any sufficient sense of extension when nearby and distant subjects are simultaneously photographed. It is also difficult to keep both nearby and distant subjects within the depth of focus simultaneously. To obtain sharp depictions of both the subjects, it is required to reduce the diameter of light bundles in a taking optical system, thereby extending the time for entering the light bundles in the image pickup device. This in turn makes an image likely to degrade due to subject blurring, etc. In addition, the influence of diffraction by stopping-down remains on an unignorable level. When the upper limit of 60° is exceeded, on the other hand, the angle of bending of the farthest-off-axis chief ray through the taking optical system becomes large and so distortion is likely to occur, resulting rather in degradation of image quality. To make correction for this distortion, it is required to make the construction of the taking optical system more complicated, leading to added cost.

Condition (2) is provided to make a light bundle entering the image pickup device substantially vertically incident on the image pickup plane. Any deviation from the upper and lower limits of −15° and 10° makes the picked-up image susceptible to degrade at its. Exceeding the upper limit also makes the size of the image-formation optical system likely to become large and aberrations liable to become worse, because the farthest-off-axis chief ray propagates toward the optical axis.

By satisfying both conditions (1) and (2) simultaneously, the image-formation optical system of the invention can be constructed as an electronic image-formation optical system well fit for landscape photography.

Reference is then made to the number of pixels needed when landscape images are enlarged to appreciation size.

In photographing a wide range of subjects, the spatial frequency becomes higher than in photography at the standard angle of view. To obtain high contrast, therefore, the number of pixels must be larger than required for ordinary photography, as explained below.

Here assume that human eye's standard resolving power is 1' (corresponding to a visual acuity of 1.0). Since this is a value at which threshold resolving power is obtained, resolving power enabling lines-and-spaces contained in an image to be perceived as a sharp image is considered to be found at a position lower than that (at a large angle). For instance, given a solid angle of about 1.67' (corresponding to a visual acuity of 0.6), consider the case where an image is viewed from a position, for instance, 40-cm away therefrom. Then, a size of as large as 0.194 mm can be perceived as a sharp image. In this respect, consider the case where a print of A4 size (210 mm×197 mm) is viewed from a 40 cm away position. To perceive the printed image as a sharp image, the number of pixels needed for an A4 print must be about 1,100×1,500=1,650,000 pixels. This value is for an A4 full-size print. With a margin of about 100 mm in mind, the number of pixels must be about 1,400,000. At a smaller number of pixels, the quality of the perceived image becomes low, because dots on the print can be in clear sight, and so an edge image is non-linearly viewed, density changes are seen in a gradation form, etc.

Even when the quantity of data is reduced, the number of pixels on an image may be increased by printing the image after interpolation on output to a printer. However, interpolation leads unavoidably to degradation of image quality, causing an edge-blunting phenomenon, etc. Thus, some significant differences are found between the interpolated image and an image obtained by direct production of the aforesaid number of pixels.

In general, printed or otherwise processed images have correlations with viewing distances. As a matter of course, a small image must be viewed at a short distance while a large image must be observed at a separate distance. If image size has linear relations to viewing distances, the sharpness perceived by a human is determined by the aforesaid solid angle, rather than pixel size. While the necessary number of pixels has been calculated for A4-size images, it is understood that the same results would be obtained for images of different sizes.

When compared with the distance at which A4 images are observed, however, the distance at which extremely small images such as A6-size (105 mm×149 mm) images are actually observed is often far away from the aforesaid relations. Accordingly, the number of pixels necessary for A6 or other image sizes is smaller than the aforesaid 1,650,000 pixels.

As a matter of course, an image prepared using an image pickup device comprises certain pixel units, and so cannot be used to reproduce an object having spatial frequencies higher than such pixel units. When a test chart comprising pattern portions having various spatial frequencies is photographed, all of a pattern wherein a line width at the narrowest line width portion is equal to a pixel pitch is observed in a resolved fashion, while a pattern having a spatial frequency higher than a pixel unit at which a line width is smaller than a pixel pitch and the narrowest line width is at least ½ of the pixel pitch is observed in the form of a low-frequency density—a so-called moiré alone.

An image with the number of pixels found by the aforesaid calculation can be clearly perceived by a human with high contrast. Accordingly, when the results of observation of the aforesaid test chart are extended to a general image, as high as a certain spatial frequency is seen sharply, yielding an image where spatial frequencies lower than the minimum pixel unit undergo no drastic resolution; no depiction of sufficient gradation can be perceived although high contrast is achieved, yielding an image having a so-called sense of coarseness.

On the other hand, silver-salt photographs are composed of particles of various sizes from a particle of the size that is below the limit of resolution and so can be perceived by a human to a particle of the size that can be sharply perceived by a human. This is believed to enable not only the contrast of images but also the gradation of images to be depicted, and have a significant influence on the high definition of images. With an image having the aforesaid pixels, it appears to be still difficult to achieve photographic image quality.

To obtain an image of ample gradation, as spatial frequencies close to the limit of resolution sensible by a human as possible must be depicted. With such an idea, the inventors have made studies of the size of the pixel unit necessary for achieving image quality equivalent to that of silver-salt photographs and consequently found that for the minimum pixel unit for image construction, a pixel unit corresponding to the aforesaid solid angle of 1.67' is insufficient and so a pixel unit corresponding to a solid angle of at least 1.25' (a visual acuity of 0.8) is needed. Of course, better results are obtained with a pixel unit corresponding to resolving power of 1' that is the limit of resolution, and much better results are achieved with a pixel unit that can be resolved with resulting power lower than 1' because much higher definition can be obtained.

Hereinafter, the size of a pixel unit corresponding to a solid angle perceivable as a sharp image will be called a "good-image threshold pixel unit", the size of a pixel unit corresponding to the solid angle necessary for obtaining the sense of gradation a "resolvable pixel unit", and the size of a pixel unit corresponding to the limit of resolution a "resolution threshold pixel unit". It is then noted that good-image threshold pixel unit>resolvable pixel unit>resolution threshold pixel unit.

In this parlance, the aforesaid results imply that when the limit of resolution is 1', the resolvable pixel unit must be equal to or lower than that corresponding to a solid angle of 1.25'. In this case, the necessary number of pixels found by the same calculation as mentioned above must be about 3,000,000 for a full-size sheet (A4), and about 2,500,000 with a margin in mind.

For general-purpose cameras designed to photograph a variety of subjects having not very high spatial frequency in the average, therefore, 2,500,000 pixels suffice with no practical problem. When weight is placed on landscape photographs having very high spatial frequencies as in the invention, however, it is necessary to make the resolvable pixel unit smaller than mentioned above.

Furthermore, the sense of horizontal extension is required for the observer to appreciate a photograph of an extensive landscape with dynamic presence. For this reason, high image quality must be insured even when an A4 full-size print is viewed from an at least 40-cm away position. According to the invention, it has been found that the number of pixels necessary for the photographic image quality of a photograph taken of an extensive landscape at a half angle of view of 36° or greater must be at least 3,500,000.

Condition (3) is provided to determine the effective number of pixels or the maximum number of recording pixels by signal processing on the basis of the aforesaid considerations. The upper limit of 20,000,000 to condition (3) is determined while the size of the resulting image date is taken into account. With pixels greater than 20,000,000, greater data compression rates are needed because the storage capacity necessary for a medium to store an image's worth of data becomes too large. However, such greater compression rates are counter to the object of the invention, because of unavoidable degradation of image quality. Incorporation of a write device for mass-capacity storage media in the image pickup system is also counter to the object of the invention, because the image pickup system becomes huge. Too great image information size is also not preferable because the transfer rate of image data or the write speed of image data on a medium becomes too slow, resulting in a grave obstacle to the usability of the image pickup system. When the lower limit of 3,500,000 to condition (3) is not reached, it is impossible to achieve the number of pixels capable of meeting the aforesaid resolvable pixel unit for landscape photography (the magnitude of the pixel unit corresponding to the solid angle necessary for obtaining the sense of gradation), and so it is difficult to obtain a high-definition image of ample gradation.

With the image pickup system of the invention, it is thus possible not only to achieve a wide angle of view for photography, but also to keep adequate image quality (especially sharpness) all over the image, which is required for wide-angle landscape photography now in need.

According to the second aspect of the invention, there is provided an image pickup system of the second aspect, wherein said image-formation optical system satisfies the following condition (4):

$$28° < \omega_{w1} + \omega_{w0} < 45° \quad (4)$$

Condition (4) is provided to determine the optimum angle of bending of the farthest-off-axis chief ray through the image-formation optical system. When the lower limit of 28° is not reached, the necessary angle of view is not obtained or the angle of incidence of light on the image pickup plane becomes improper at the margin of an image. When the upper limit of 45° is exceeded, the bending of the farthest-off-axis chief ray becomes too large to make correction for aberrations throughout the image-formation optical system.

According to the third aspect of the invention, there is provided an image pickup system of any one of the first and second aspects, wherein the diagonal length D of an image pickup plane of said electronic image pickup device satisfies the following condition (5):

$$5 \text{ mm} < D < 30 \text{ mm} \quad (5)$$

Condition (5) is provided to place the size of the image-formation optical system and image quality in a well-balanced state. In general, the larger the size of an image pickup plane, the lower the Nyquist frequency is and, hence, the better the image-formation capability is. However, if an electronic image pickup device has at least 3,500,000 pixels as contemplated in the invention, it is then possible to reproduce an image of good gradation even when an image pickup plane is of size with increasing Nyquist frequency. When the image pickup plane is smaller than the lower limit of 5 mm, the pixel pitch (inter-pixel distance) becomes relatively short. In this case, it is required to enhance the image-formation capability of the image-formation optical system; the image-formation optical system is likely to be affected by fabrication errors. When the image pickup plane is greater than the upper limit of 30 mm, on the other hand, it is required to increase the overall size of the optical system, thereby satisfying the aforesaid condition (2).

According to the fourth aspect of the invention, there is provided an image pickup system of any one of the 1st to 3rd aspects, wherein said image-formation optical system has an image-formation capability that satisfies the following condition (6), and said electronic image pickup device satisfies the following condition (7):

$$1.05 < \phi_w/P \times \sqrt{(3.5/N)} < 8/0 \quad (6)$$

$$0.0015 < P < 0.008 \text{ (mm)} \quad (7)$$

Here $\phi_w$ is the diameter in mm of a 90% encircled energy of a point spread function by amplitude by an optical system at an f number of F5.6 at substantially the center of an image plane and a wavelength e-line, from which a low-pass action due to an optical low-pass filter is eliminated or, alternatively, the diameter of the 90% encircled energy at the wide-angle end in the case where said image-formation optical system is a zoom optical system, and P is the pixel pitch in mm of the image pickup device.

The aforesaid condition (6) should preferably be satisfied when the number of pixels found from the resolvable pixel unit (the magnitude of a pixel unit corresponding to the limit of resolution) is 3,500,00.

Wide-range photography with increasing spatial frequency requires at least 3,500,000 pixels as already explained. More importantly in this case, however, it is not always necessary to achieve contrast as high as the spatial frequency corresponding to the resolvable pixel unit. It is necessary to achieve contrast as high as the spatial frequency corresponding to the good-image threshold pixel unit. Still, frequencies higher than that cannot be perceived by a human per se with high contrast, and so any decrease in the contrast of an image forms no obstacle at all to representing the gradation of the image.

Therefore, when, for instance, the resolvable pixel unit and each pixel on an image pickup device have 1-to-1 relations, it is not always necessary for an optical system to have high contrast performance at the spatial frequency corresponding to the pixel pitch of the image pickup device or at the so-called Nyquist frequency.

When the pixel pitch of an image pickup device is smaller than the resolvable pixel unit, i.e., when the image pickup device has pixels more than required for an image, the pixel pitch corresponding to the resolvable pixel unit will suffice for the intended purpose.

Here the point of view is turned from the number of pixels to the pixel pitch. In other words, an account is now given of how the number of pixels is increased, rather than what happens with simply increasing pixels, as well as of the image-formation performance then demanded for an optical system.

According to the invention, the number of pixels is increased by reducing the pixel pitch of the image pickup device. How optical performance is then affected is explained.

With an electronic image pickup system, images of contrast given by a transfer function for an optical system are not necessarily obtained; the transfer function degrades depending on the size of the photoelectric conversion portion of an image pickup device, i.e., a so-called aperture in the image pickup device, because the aperture has a finite area where the quantity of light is averaged.

For simplification, given an approximately rectangular aperture. Then, degradation of the transfer function may be described as a sinc function by Fourier transformation, as shown in FIG. 12, on the premise, however, that the area ratio of the size of the aperture to the pitch interval or the so-called aperture efficiency is 70%.

For instance, consider the case where, for photography, an optical system having such MTF characteristics as shown in FIG. 13 is used together with an image pickup device having a pitch interval of 7.5 μm, a device size of ⅔ inches and about 1,000,000 pixels. Total MTF characteristics with degradation at the aperture taken into consideration are reduced to those shown in FIG. 14 (i.e., the value for a curve at a pitch interval of 7.5 μm in FIG. 12 is multiplied by the value for a curve in FIG. 13).

Then, consider the case where an optical system having the same FTF characteristics as referred to above and shown in FIG. 13 is used on the premise that with the same device size about 2,300,000 pixels are achieved by reducing the pixel pitch to 5 μm. In this case, total MTF characteristics with degradation at the aperture kept in mind are reduced to those shown in FIG. 15 (i.e., the value for a curve at a pitch interval of 5 μm in FIG. 12 is multiplied by the value for a curve in FIG. 13).

From FIGS. 14 and 15, it is seen that the transfer function at the aperture in the image pickup device is so kept from degradation that the total optical performance can rather be enhanced. By finding the proper number of pixels on the basis of the aforesaid considerations and determining that number of pixels by reducing the pixel pitch, it is thus possible to make the level of performance to be insured by an optical system alone lower than that anticipated by a conventional method wherein on the premise that the transfer function necessarily degrades at the aperture in the image pickup device, such degradation is made up for by pre-enhanced performance.

Referring to the performance demanded for the optical system of an image pickup device, it is also found that it is acceptable for the diameter of the 90% encircled energy of the point spread function by amplitude to be up to about 8 times as large as the aforesaid resolvable pixel unit. At a diameter larger than this, contrast becomes too low to achieve resolution at the spatial frequency for the aforesaid good-image threshold pixel unit, although much higher optical performance is permissible.

By satisfying condition (6) together with the aforesaid condition (3), images of satisfactory gradation can be obtained. In other words, printed images of the desired image quality can be ensured even in the absence of any high optical performance, because it is possible to make enlargement magnification low by high-density printing. When the lower limit of 1.05 to condition (6) is not reached, the optical performance of the optical system is so enhanced that images of high quality are obtained. It is noted, however, that any desired performance cannot often be obtained unless more lenses are used, it is required to increase the size of the lens system, thereby reducing the amount of aberrations produced at the respective lenses, or the like. In either case, some inconveniences are encountered in terms of cost and size reductions. Otherwise, close fabrication tolerances are needed and so the cost of the lens system can be cut down only with difficulty. In some cases, the number of pixels becomes larger than required, resulting in added costs. When the upper limit of 8.0 to condition (6) is exceeded, contrast becomes too low to obtain resolution at the spatial frequency for the good-image threshold pixel unit (the magnitude of a pixel unit corresponding to a solid angle, which can be perceived as a sharp image) as mentioned above and, hence, obtain high-definition images.

When the lower limit of 0.0015 mm to condition (7) is not reached or the pixel pitch becomes short, any optical lens capable of meeting condition (6) cannot be fabricated. When the upper limit of 0.008 mm to condition (7) is exceeded, the size of the image pickup system cannot be reduced and so the cost of the image pickup device rises.

It is noted that the upper and lower limits to condition (1) may be varied within the range defined thereby. For instance, the following condition (1-1) is preferable because the sense of extension and the correction of aberrations throughout the optical system can be placed in a well-balanced state.

$$36.4° < \omega_{wl} < 45° \qquad (1\text{-}1)$$

The upper and lower limits to condition (2) may be varied within the range defined thereby. To improve the image quality on the margin of an image, it is preferable to meet the following condition (2-1), and especially the following condition (2-2):

$$-8° \leq \omega_{w0} < 5° \qquad (2\text{-}2)$$

$$-6° \leq \omega_{w0} < 2° \qquad (2\text{-}3)$$

The upper and lower limits to condition (3) may be varied within the range defined thereby. To obtain better image quality, it is preferable to meet the following condition (3-1), especially (3-2) and more especially (3-3):

$$4 < N < 20 \text{ (in million)} \qquad (3\text{-}1)$$

$$5 < N < 20 \text{ (in million)} \qquad (3\text{-}2)$$

$$5 < N < 20 \text{ (in million)} \qquad (3\text{-}3)$$

The upper and lower limits to condition (4) may be varied within the range defined thereby. To place the difficulty of optical system design and the necessary performance in a well-balanced state, it is preferable to meet the following condition (4-1), and especially (4-2):

$$30° < \omega_{wl} + \omega_{w0} < 44° \qquad (4\text{-}1)$$

$$34° < \omega_{wl} + \omega_{w0} < 43° \qquad (4\text{-}2)$$

The upper and lower limits to condition (5) may be varied within the range defined thereby, as represented typically by the following conditions (5-1), (5-2) and (5-3).

The smaller the size of the image pickup plane, the smaller the image-formation optical system can be, but the severer the design is. In this regard, the performance of the image-formation optical system can be compensated for by making the effective number of pixels (or the maximum number of recording pixels) a bit more. Referring to the size of the image pickup plane, it is preferable to determine the number of pixels depending on the diagonal length of the image pickup plane, thereby achieving a balance among optical performance, the fabrication cost of image pickup devices and image quality.

More specifically, when 5 mm<D≦10 mm (5-1), it is preferable that 3.5<N≦6.5 (in million) (3-4). It is more preferable that the upper limit is set at 5.5.

When 10 mm<D≦16.5 mm (5-2), it is preferable that 4.5<N≦8.5 (in million) (3-5). It is more preferable to set the upper limit at 7.5, and especially at 6.5.

When 16.5 mm<D<30 mm (5-3), it is preferable that 5.5<N<11 (in million) (3-6). It is more preferable to set the upper limit at 10.0, especially 9.5, and more especially 8.5.

Referring to the case where the diagonal length of the image pickup plane is 30 mm or greater, when 30 mm≦D<40 mm (5-4), it is preferable that 6.5≦N<14.0 (in million) (3-7).

When 40 mm≦D<80 mm (5-5), it is preferable that 7.5≦N<20.0 (in million) (3-8).

When the upper limits to the aforesaid conditions (3-1), (3-2), (3-3), (3-4) and (3-5) are exceeded, the pixel pitch of the image pickup device becomes too short for fabrication. When the lower limits are not reached, on the other hand, the number of pixels with respect to the image pickup area becomes small; the balance of performance of the image pickup device against fabrication cost becomes worse.

The upper and lower limits to condition (6) may be varied within the range defined thereby. To achieve a balance between the clearness of printed images obtained through the image pickup device and cost, it is preferable to meet the following condition (6-1):

$$1.3 < \phi_w / P \times \sqrt{(3.5/N)} < 3.0 \qquad (6\text{-}1)$$

The upper and lower limits to condition (7) may be varied within the range defined thereby. To ensure the necessary number of pixels and for ease of electronic image pickup fabrication, it is more preferable to meet the following condition (7-1):

$$0.002 < P < 0.007 \text{ (mm)} \qquad (7\text{-}1)$$

According to the fifth aspect of the invention, there is provided an image pickup system of any one of the 1st to 4th aspects, wherein said image-formation optical system is a zoom lens including a wide-angle end, in which a half angle of view with respect to a subject on an infinite object point is 36° or greater.

Especially with the image pickup system of this aspect, good images can be obtained by using an electronic image pickup device having an adequate number of pixels. For instance, it is thus possible to enjoy clear-cut landscape photographs enlarged to sufficient appreciation size, even with an image-formation optical system difficult to maintain optical performance at the wide-angle end, for instance, a zoom lens having a zoom ratio of 3 or greater, 5 or greater, and 10 or greater.

In particular, the higher the zoom ratio E of an image-formation optical system, the more difficult it is to keep high optical performance. It is thus preferable to associate the number of pixels, N, with the zoom ratio E, as mentioned below.

When 2.3<E<5.1, it is preferable that 3.5<N (in million).
When 5.1≦E<10.0, it is preferable that 4.0<N (in million)
When 10.0≦E<20, it is preferable that 5.0<N (in million).

It is noted that the aforesaid number of pixels N is not always limited to the effective number of pixels (in million) for an electronic image pickup device, and so may be the maximum number of recording pixels (in million) by signal processing. For more natural production of images, the number of pixels N should preferably be the effective number of pixels (in million).

According to the sixth aspect of the invention, there is provided an image pickup system of any one of the 1st to 3rd aspects, wherein said image-formation optical system is of image-formation capability satisfying the following condition (8):

$$1.5 < \phi_w/P < 8.0 \qquad (8)$$

Here $\phi_w$ is the diameter in mm of a 90% encircled energy of a point spread function by amplitude by an optical system at an f number of F5.6 at substantially the center of an image plane and a wavelength e-line, from which a low-pass action due to an optical low-pass filter is eliminated or, alternatively, the diameter of the 90% encircled energy at the wide-angle end in the case where said image-formation optical system is a zoom optical system, and P is the pixel pitch in mm of the image pickup device.

With this arrangement, the diameter in mm of the 90% encircled energy of the point spread function by amplitude by an optical system at an f number of F5.6 at substantially the center of an image plane and a wavelength e-line, from which a low-pass action due to an optical low-pass filter is eliminated, stands across a plurality of pixels, so that the low-pass filter effect can be obtained. When the lower limit of 1.5 is not reached, the low-pass filter effect becomes slender; it is required to enhance the image-formation capability of the optical system. When the upper limit of 8.0 is exceeded, on the other hand, it is difficult to obtain any sharp images.

More preferably, condition (8) should be reduced down to:

$$1.8 < \phi_w/P < 4.5 \qquad (8)$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is illustrative of the general construction of one image pickup system set up according to the invention.

DESCRIPTION OF THE PREFERRED EMBODIMENTS

Figure 2A:
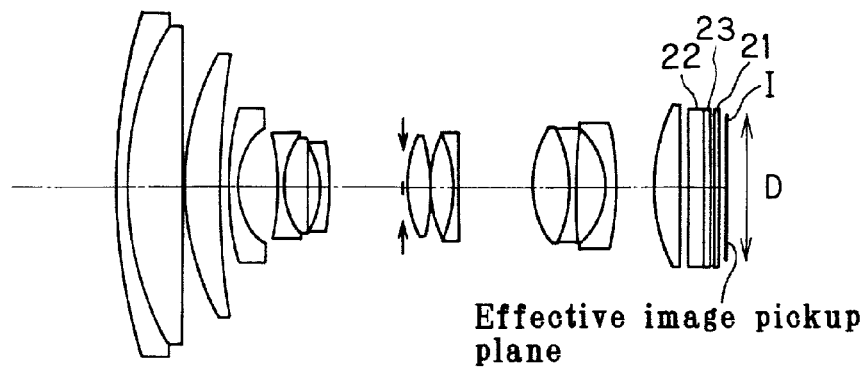
FIGS. 2(a), 2(b) and 2(c) are sectional views at the wide-angle end (a), in the standard state (b) and at the telephoto end (c) of a lens system forming an optical system in Example 1 of the invention.

Some embodiments of the image pickup system of the invention are now explained.

One specific embodiment of the image pickup system of the invention generally comprises, as shown in FIG. 1, an optical system 10 for forming the image of a subject, an image pickup device 20 including a CCD, etc. located at an image-formation position, a signal processor circuit 30 for processing image signals obtained at the image pickup device 20, a storage device 40 connected to the signal processor circuit 30 for storing image data about a picked-up image, a display device 50 connected to the signal processor circuit 30 for displaying the picked-up image, and an output device 60 such as a printer for producing image output.

The optical system 10 also comprises an aperture stop 70 including a plurality of feather stops (not shown), which are so moved that the size of an aperture is variable around the optical axis of the optical system 10. By an exposure control circuit 80 for control of both the size of the aperture in the aperture stop 70 and exposure time by the image pickup device 20, the quantity of light to be read by the image pickup device 20 can be properly controlled.

This exposure control comprising a combination of aperture size and exposure time may be automatically set by the exposure control circuit 80 upon the measurement of a subject condition. Otherwise, the aperture value and exposure time may be arbitrarily set by the user so that the exposure time or aperture value is automatically controlled or the aperture stop and exposure time is set by user's preference.

Figure 11:
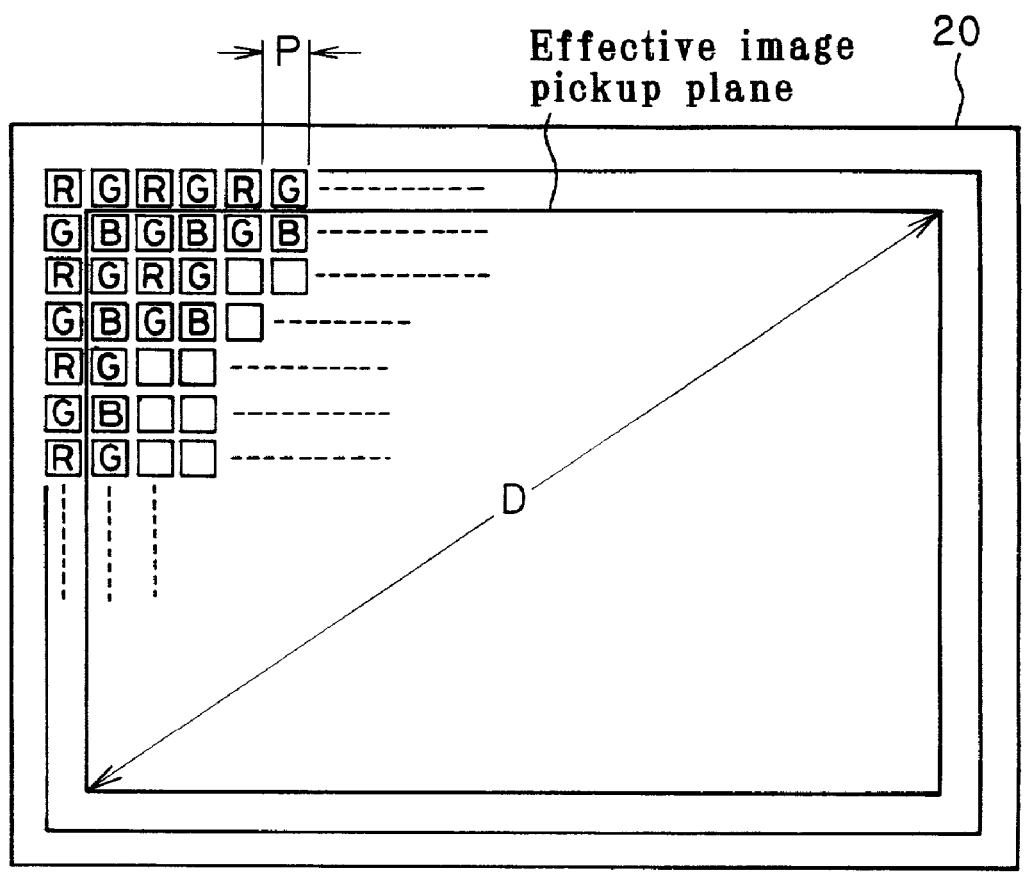
FIG. 11 is illustrative of an array of pixels on an image pickup device in an image pickup system according to the invention.
Figure 12:
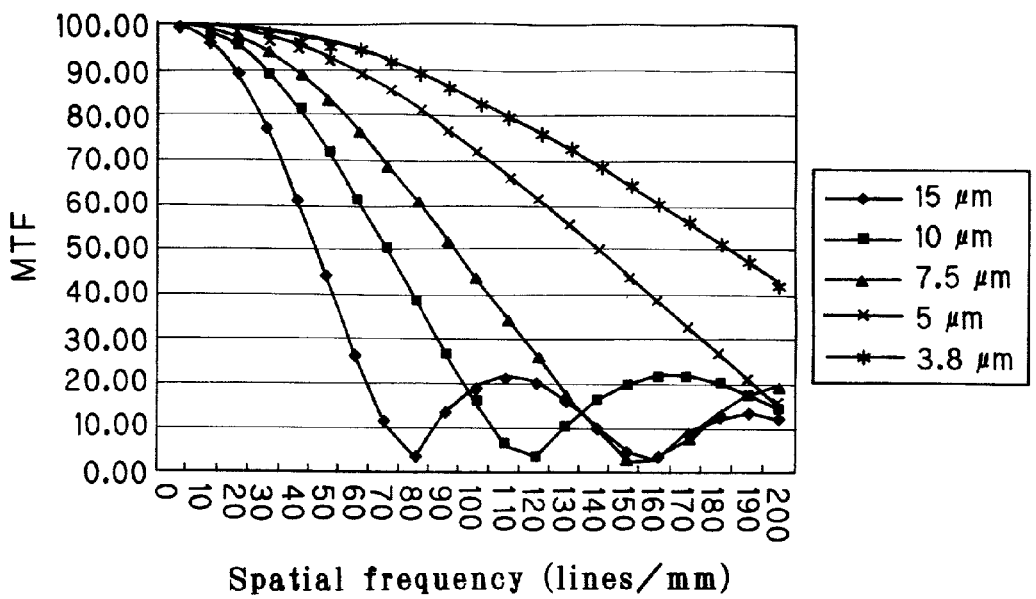
FIG. 12 is a graph for degradation of a transfer function in the case of an approximately rectangular aperture in an image pickup device.
Figure 13:
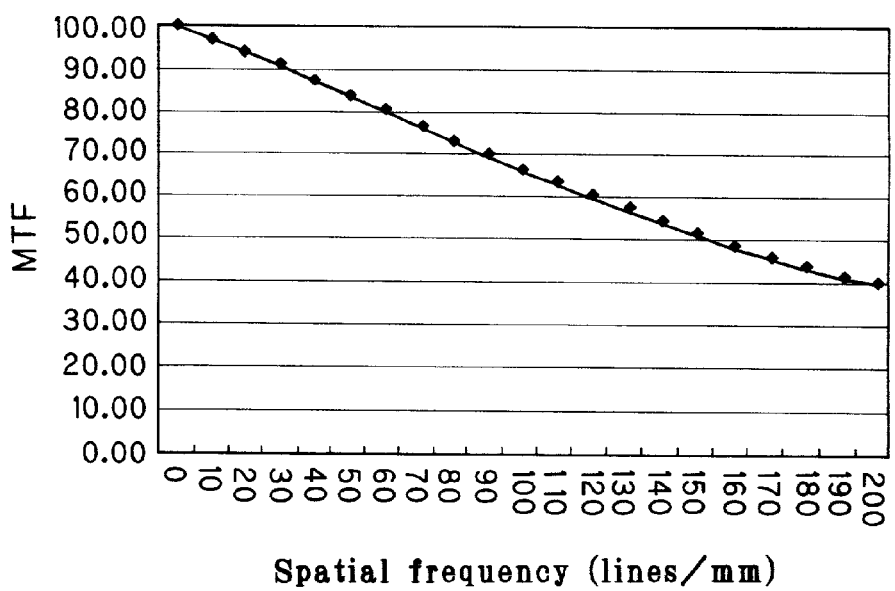
FIG. 13 is a graph for the MTF characteristics of an optical system.
Figure 14:
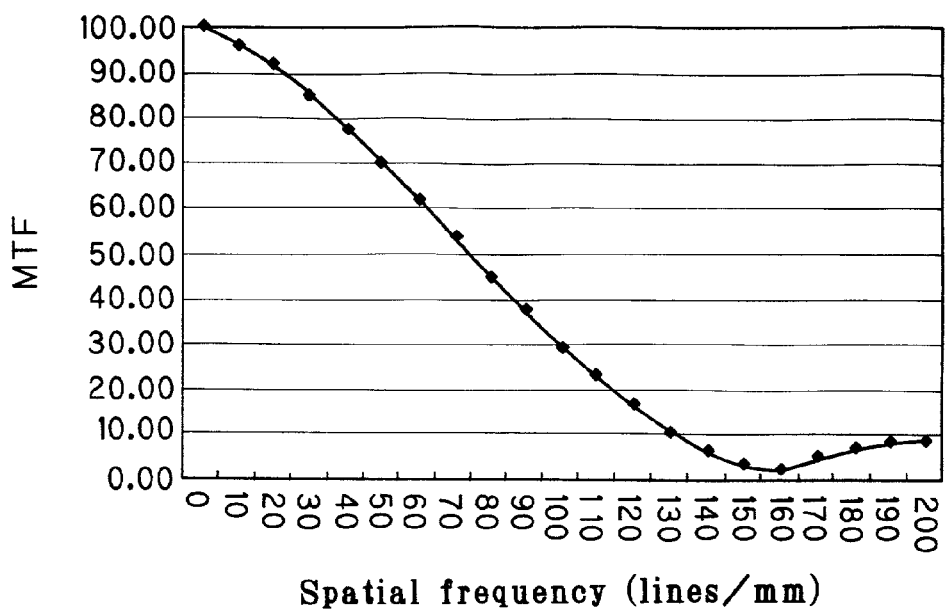
FIG. 14 is a graph for total MTF characteristics with degradation at an aperture taken into consideration.
Figure 15:
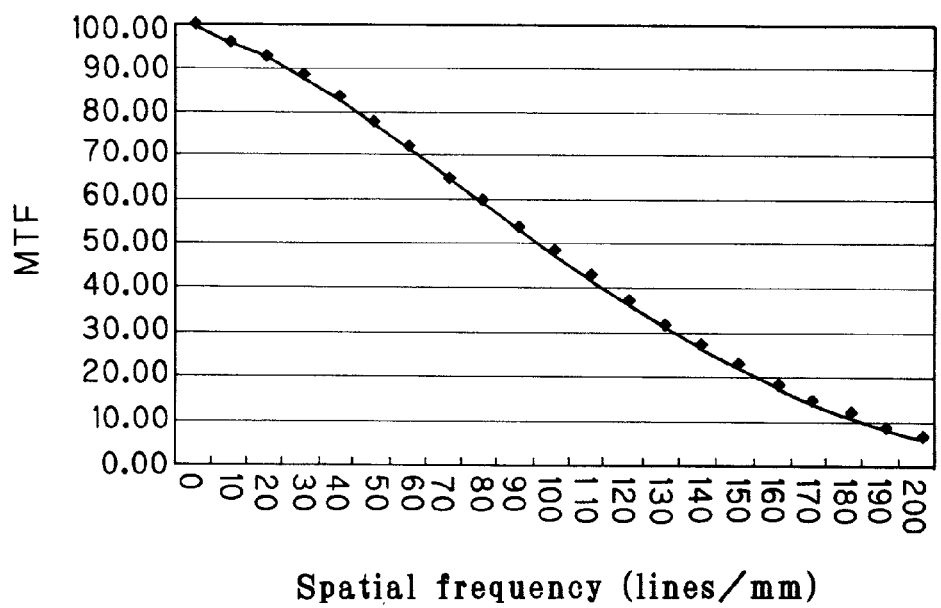
FIG. 15 is a graph for total MTF characteristics at a reduced pixel pitch.

FIG. 11 is illustrative of how pixels are arranged on the image pickup device 20. As shown, pixels R, G and B are arranged at a pixel pitch P in a mosaic pattern. The effective image pickup plane shown is located at a region having pixels less than the total number of pixels on the image pickup device 20 in such a way as to conform to the performance of the optical system. D is the diagonal length of this effective image pickup plane. Image information received at the image pickup plane is subjected to signal processing at the signal processor circuit 30. However, it is noted that the image information should be recorded at the same number of pixels as that on the effective image pickup plane. Alternatively, the pixels may be arranged on the image pickup device 20 in a honeycomb pattern so that image information is recorded with pixels more than the effective pixels. In what follows, Examples 1, 2 and 3 concerning a lens system used for the optical system 10 and the image pickup device 20 used therewith are primarily explained.

EXAMPLE 1

In this example, a zoom lens system is used as the optical system 10. The image pickup device 20 used herein has a length of ⅔ inches, an effective image pickup plane with a long side of 17.6 mm and a short side of 13.2 mm, a diagonal length D of 22.0 mm, 6,450,000 effective pixels (2,933 pixels for each long side and 2,200 pixels for each short side) and a pixel size P of 0.006 mm.

Figure 2B:
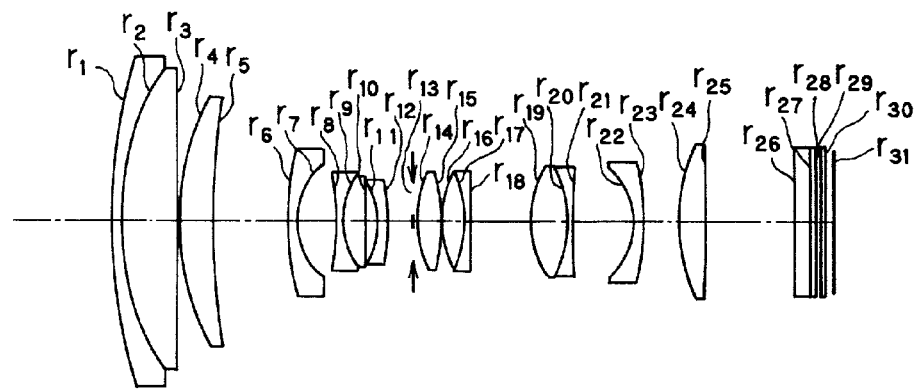
Figure 2C:
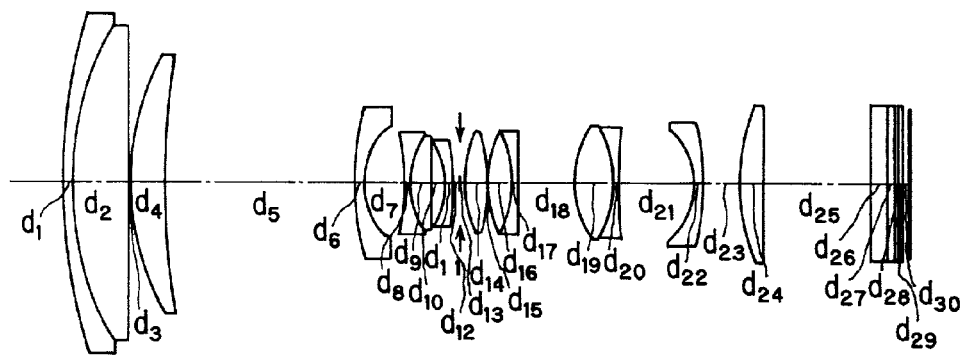
Figure 3A:
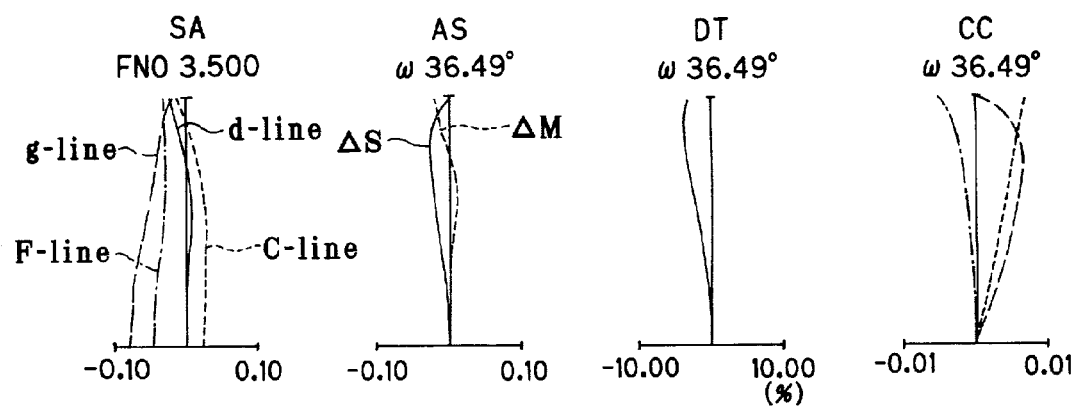
FIGS. 3(a), 3(b) and 3(c) are aberration diagrams at the wide-angle end (a), in the standard state (b) and at the telephoto end (c) for the lens system forming an optical system in Example 1 of the invention.
Figure 3B:
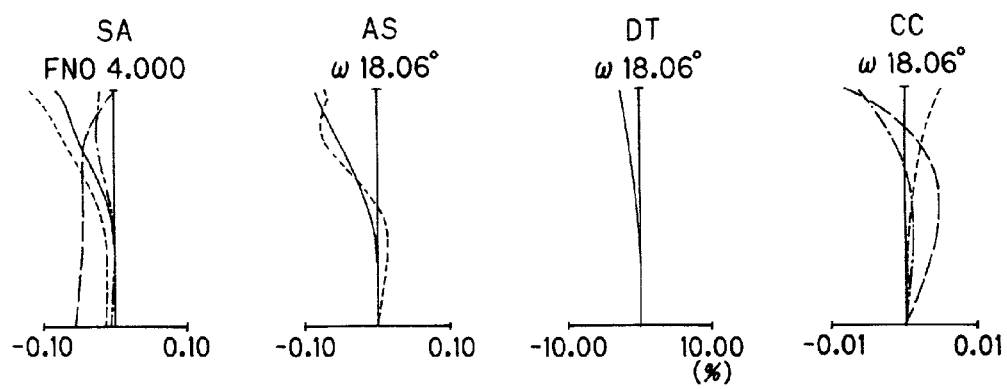
Figure 3C:
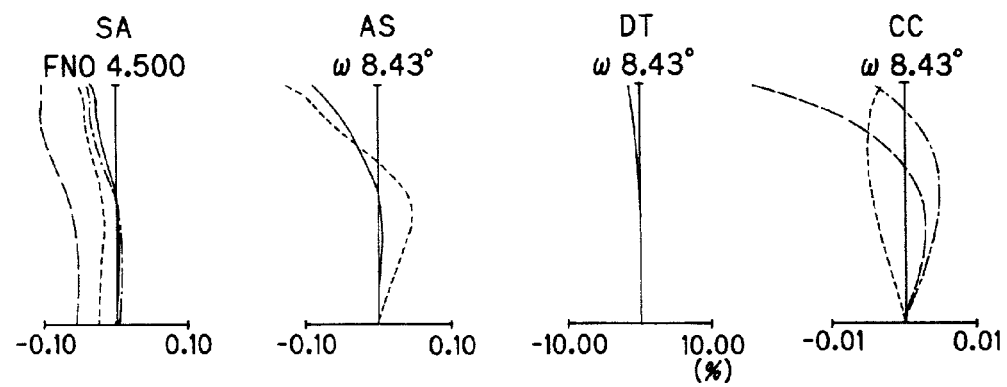
Figure 8:
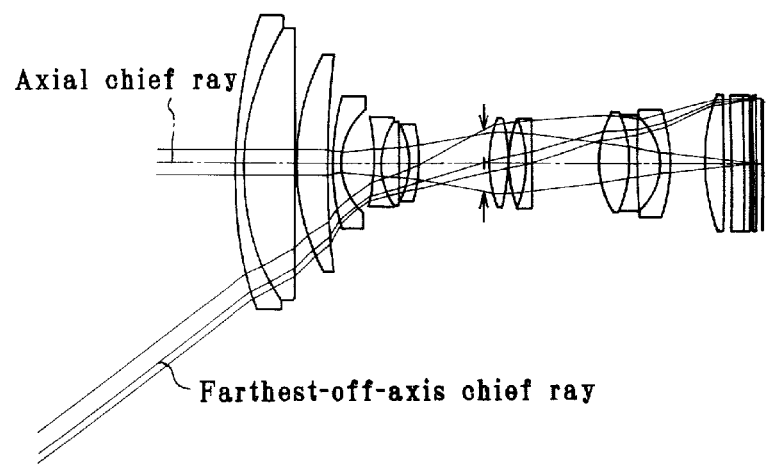
FIG. 8 is illustrative of an optical path at the wide-angle end for Example 1 of the invention.

As the lens system forming the optical system 10, a zoom lens system constructed as shown in FIGS. 2(*a*), 2(*b*) and 2(*c*) that are sectional views thereof at the wide-angle end (a), in the standard state (b) and at the telephoto end (c). Between the lens system and an image plane I there are located plane-parallel plates that form filters such as a cover glass 21, a low-pass filter 22, and an IR cut filter 23 for the image pickup device 20. For this lens system with lens data given later, an aspheric surface is used. FIG. 8 is illustrative of an optical path for this example at the wide-angle end. Aberration diagrams for this example at the wide-angle end (a), in the standard state (b) and at the telephoto end (c) are attached hereto as FIGS. 3(*a*), 3(*b*) and 3(*c*) wherein SA, AS, DT and CC represent spherical aberrations, astigmatism, distortion and chromatic aberration of magnification, respectively, and "ω" stands for a half angle of view. The same will go true for the following aberrations.

The depth of field can be controlled with an f number exceeding F4, so that a compact, low-cost image pickup system can be achieved.

In this example, the size of the aperture can be regulated in a multistage manner or continuously from the f number on stop-on to around F16.

Given below are the values for the conditions involved.
$\omega_{w1}=36.49°$
$\omega_{w0}=-7.2°$
N=6.45 (×1,000,000 pixels)
$\omega_{w1}+\omega_{w0}=29.29°$
D=22 mm
$\phi_w=0.012$ mm
P=0.006 mm
$\phi_w/P\times\sqrt{(3.5/N)}=1.473$
E=5.0
$\phi_w/P=2.0$

EXAMPLE 2

In this example, a zoom lens system is used as the optical system 10. The image pickup device 20 used herein has a length of ⅔ inches, an effective image pickup plane with a long side of 8.8 mm and a short side of 6.6 mm, a diagonal length D of 11.0 mm, 6,450,000 effective pixels (2,933 pixels for each long side and 2,200 pixels for each short side) and a pixel size P of 0.003 mm.

Figure 4A:
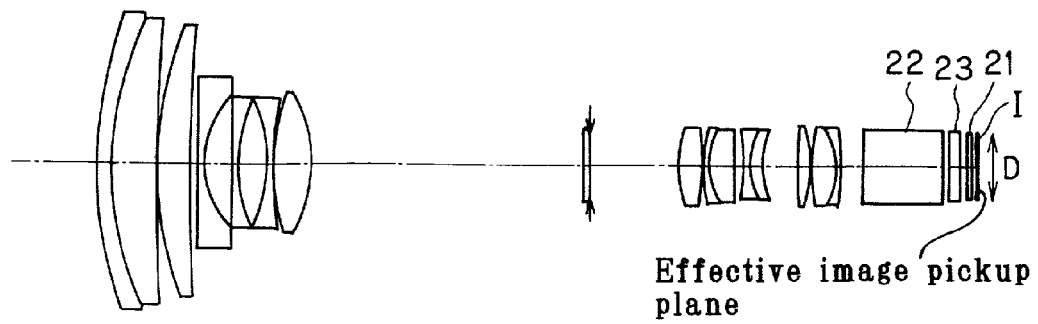
FIGS. 4(a), 4(b) and 4(c) are sectional views at the wide-angle end (a), in the standard state (b) and at the telephoto end (c) of a lens system forming an optical system in Example 2 of the invention.
Figure 4B:
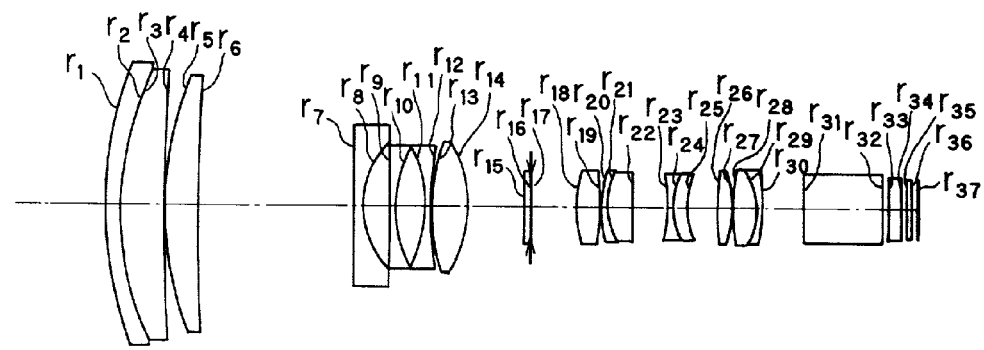
Figure 4C:
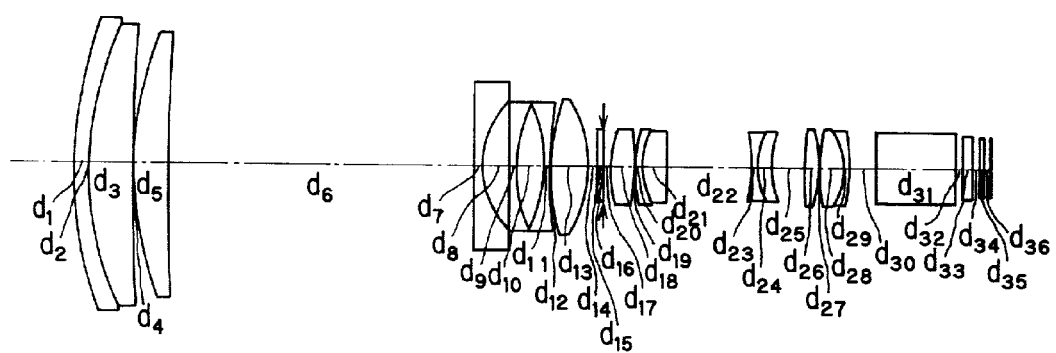
Figure 5A:
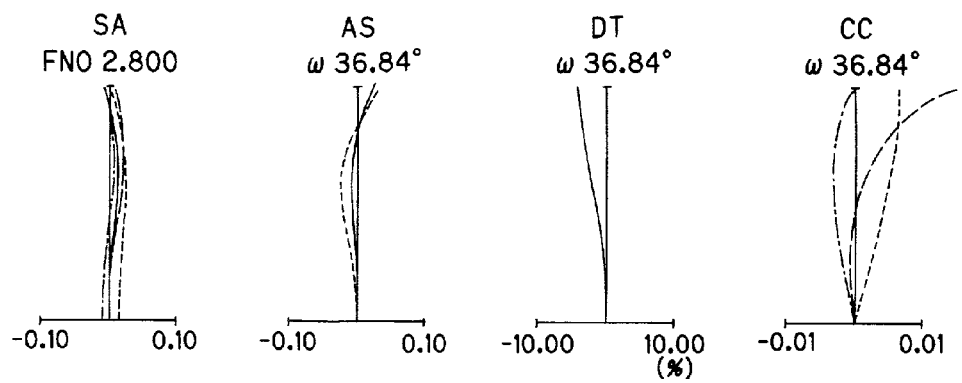
FIGS. 5(a), 5(b) and 5(c) are aberration diagrams at the wide-angle end (a), in the standard state (b) and at the telephoto end (c) for the lens system forming an optical system in Example 2 of the invention.
Figure 5B:
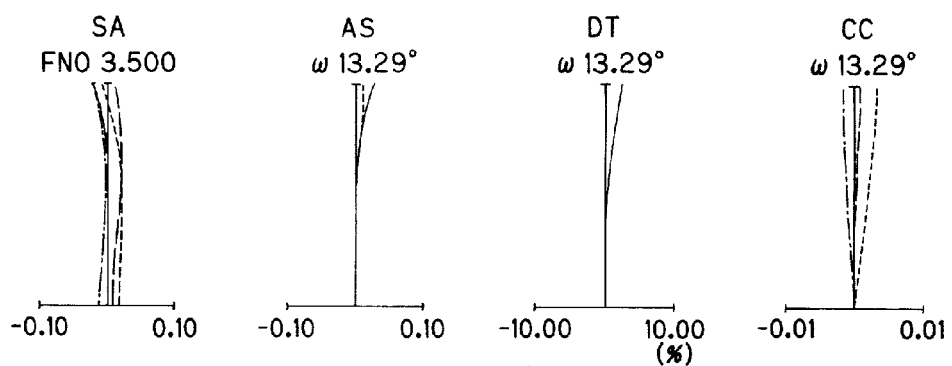
Figure 5C:
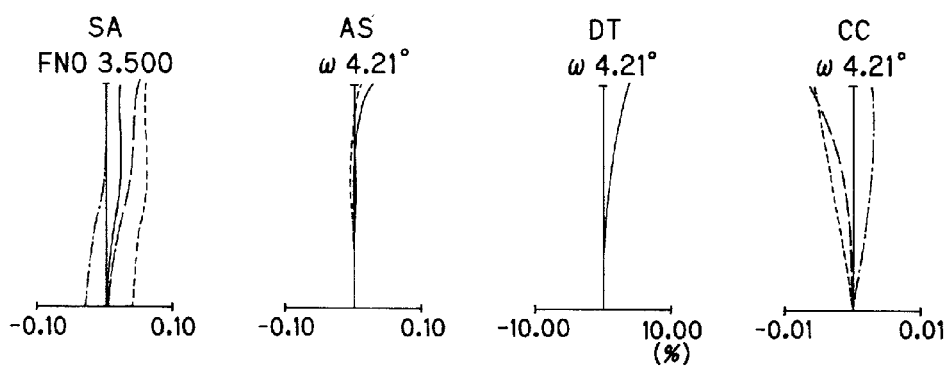
Figure 9:
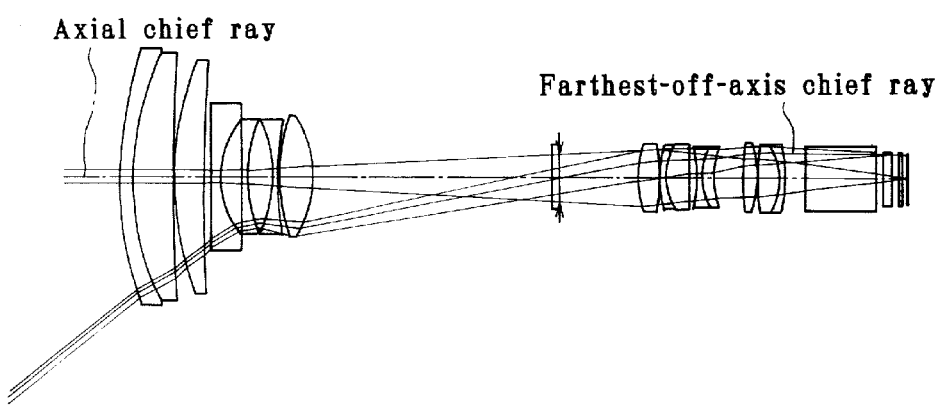
FIG. 9 is illustrative of an optical path at the wide-angle end for Example 2 of the invention.

As the lens system forming the optical system 10, a zoom lens system constructed as shown in FIGS. 4(*a*), 4(*b*) and 4(*c*) that are sectional views thereof at the wide-angle end (a), in the standard state (b) and at the telephoto end (c). Between the lens system and an image plane I there are located plane-parallel plates that form filters such as a cover glass 21, a low-pass filter 22, and an IR cut filter 23 for the image pickup device 20. For this lens system with lens data given later, an aspheric surface is used. FIG. 9 is illustrative of an optical path for this example at the wide-angle end.

The depth of field can be controlled with an f number exceeding F4, so that a compact, low-cost image pickup system can be achieved.

In this example, the size of the aperture can be regulated in a multistage manner or continuously from the f number on stop-on to around F16.

Given below are the values for the conditions involved.
$\omega_{w1}=36.86°$
$\omega_{w0}=-0.39°$
N=6.45 (×1,000,000 pixels)
$\omega_{w1}+\omega_{w0}=36.45°$
D=11 mm
$\omega_w=0.012$ mm
P=0.003 mm
$\omega_w/P\times\sqrt{(3.5/N)}=2.947$
E=10.2
$\omega_w/P=4.0$

EXAMPLE 3

In this example, a zoom lens system is used as the optical system 10. The image pickup device 20 used herein has a length of ⅔ inches, an effective image pickup plane with a long side of 17.6 mm and a short side of 13.2 mm, a diagonal length D of 22.0 mm, 6,450,000 effective pixels (2,933 pixels for each long side and 2,200 pixels for each short side) and a pixel size P of 0.006 mm.

Figure 6A:
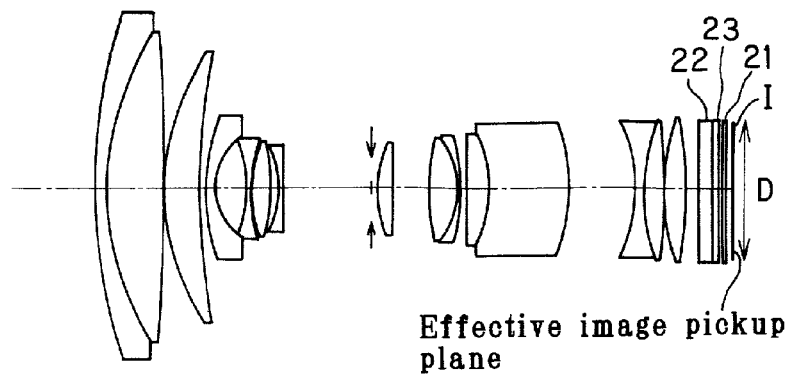
FIGS. 6(a), 6(b) and 6(c) are sectional views at the wide-angle end (a), in the standard state (b) and at the telephoto end (c) of a lens system forming an optical system in Example 3 of the invention.
Figure 6B:
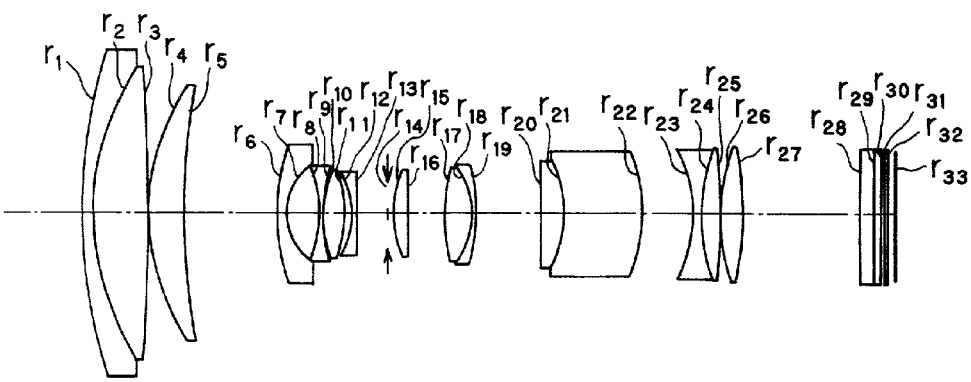
Figure 6C:
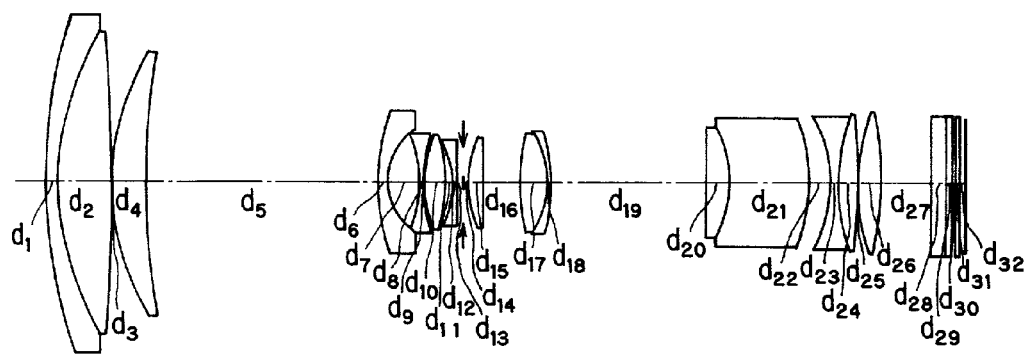
Figure 7A:
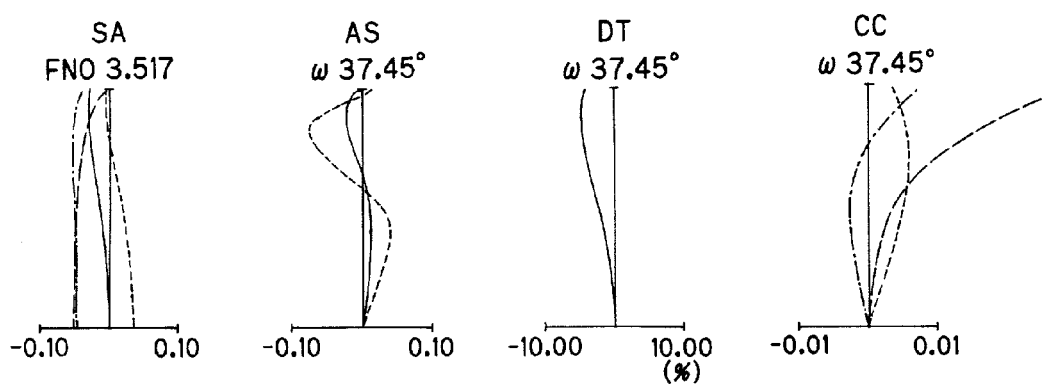
FIGS. 7(a), 7(b) and 7(c) are aberration diagrams at the wide-angle end (a), in the standard state (b) and at the telephoto end (c) for the lens system forming an optical system in Example 3 of the invention.
Figure 7B:
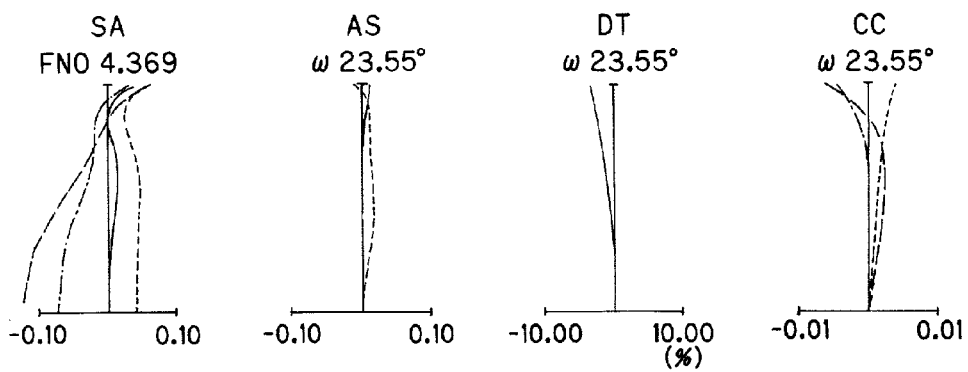
Figure 7C:
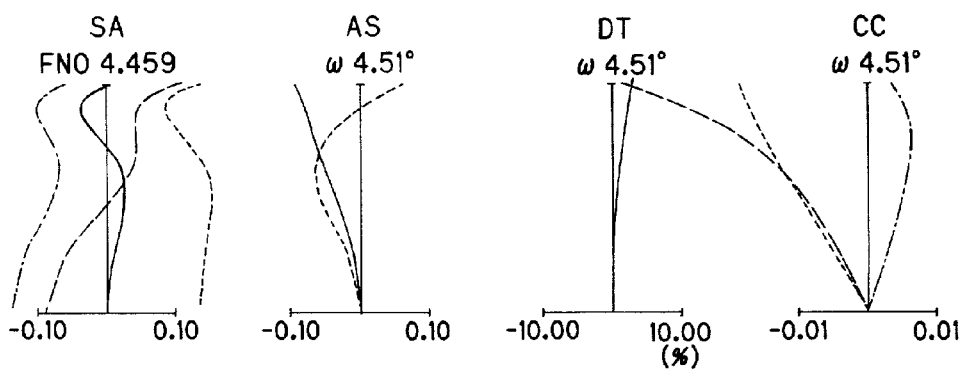
Figure 10:
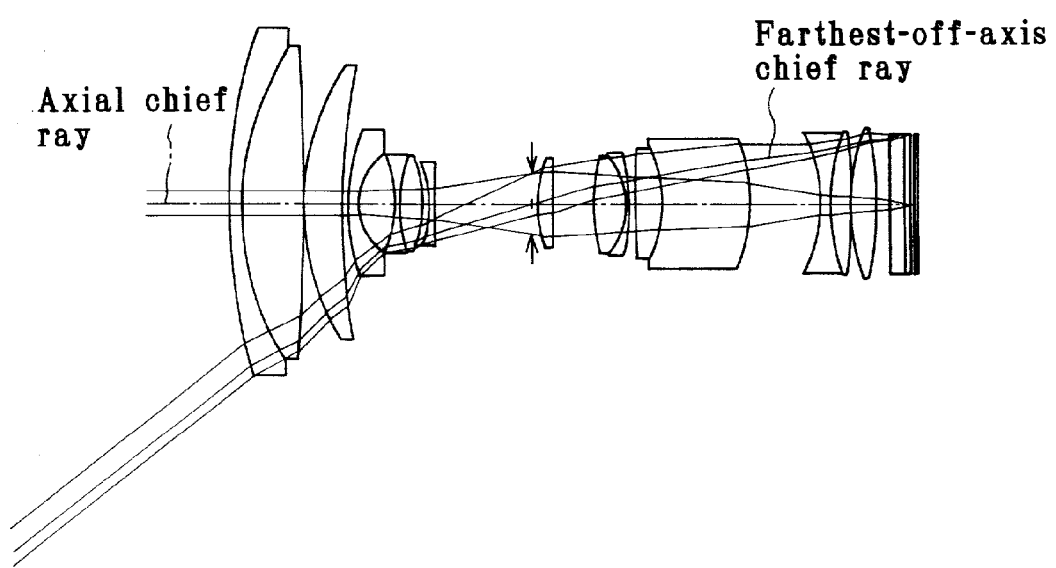
FIG. 10 is illustrative of an optical path at the wide-angle end for Example 3 of the invention.

As the lens system forming the optical system 10, a zoom lens system constructed as shown in FIGS. 6(*a*), 6(*b*) and 6(*c*) that are sectional views thereof at the wide-angle end (a), in the standard state (b) and at the telephoto end (c). Between the lens system and an image plane I there are located plane-parallel plates that form filters such as a cover glass 21, a low-pass filter 22, and an IR cut filter 23 for the image pickup device 20. For this lens system with lens data given later, an aspheric surface is used. FIG. 10 is illustrative of an optical path for this example at the wide-angle end.

The depth of field can be controlled with an f number exceeding F4, so that a compact, low-cost image pickup system can be achieved.

In this example, the size of the aperture can be regulated in a multistage manner or continuously from the f number on stop-on to around F16.

Given below are the values for the conditions involved.
$\omega_{w1}=37.45°$
$\omega_{w0}=-5.39°$
N=6.45 (×1,000,000 pixels)
$\omega_{w1}+\omega_{w0}=32.06°$
D=22.0 mm
$\phi_w=0.015$ mm
P=0.006 mm
$\phi_w/P\times\sqrt{(3.5/N)}=1.842$
E=9.7
$\phi_w/P=2.5$ Enumerated below are the numerical data on the optical system 10 gin each example. The symbols used hereinafter but not hereinbefore have the following meanings.

$F_{NO}$: f number,
$\phi_s$: stop diameter in mm,
$r_1, r_2, \ldots$: radius of curvature of each lens surface in mm,
$d_1, d_2, \ldots$: spacing between lens surfaces in mm,
$n_{d1}, n_{d2}, \ldots$: d-line refractive index of each lens, and
$\nu_{d1}, \nu_{d2}, \ldots$: Abbe's number of each lens.

WE, ST and TE represent the wide-angle end, the standard state and the telephoto end, respectively. Here let x represent an optical axis provided that the direction of propagation of light is positive and y indicate a direction perpendicular with respect to the optical axis. Then, aspheric surface shape is given by $$x=(y^2/r)/[1+\{1-P(y/r)^2\}^{1/2}]+A_4 y^4+A_6 y^6+A_8 y^8+A_{10} y^{10}$$

where r is a paraxial radius of curvature, P is a conical coefficient, and $A_4$, $A_6$, $A_8$, and $A_{10}$ are the 4th, 6th, 8th and 10th aspheric coefficients.

Example 1

EXAMPLE 1

| | | | |
|---|---|---|---|
| $r_1 = 8.670$ | $d_1 = 1.50$ | $n_{d1} = 1.80518$ | $\nu_{d1} = 25.42$ |
| $r_2 = 44.526$ | $d_2 = 8.70$ | $n_{d2} = 1.49700$ | $\nu_{d2} = 81.54$ |
| $r_3 = 3874659.084$ | $d_3 = 0.20$ | | |
| $r_4 = 38.299$ | $d_4 = 5.50$ | $n_{d3} = 1.62299$ | $\nu_{d3} = 58.16$ |
| $r_5 = 149.092$ | $d_5 = $ (Variable) | | |
| $r_6 = 47.513$ (Aspheric) | $d_6 = 1.20$ | $n_{d4} = 1.77250$ | $\nu_{d4} = 49.60$ |
| $r_7 = 10.705$ | $d_7 = 5.90$ | | |
| $r_8 = -37.283$ | $d_8 = 1.05$ | $n_{d5} = 1.77250$ | $\nu_{d5} = 49.60$ |
| $r_9 = 11.991$ | $d_9 = 3.50$ | $n_{d6} = 1.84666$ | $\nu_{d6} = 23.78$ |
| $r_{10} = -159.526$ | $d_{10} = 1.70$ | | |
| $r_{11} = -14.017$ | $d_{11} = 1.20$ | $n_{d7} = 1.77250$ | $\nu_{d7} = 49.60$ |
| $r_{12} = -38.158$ | $d_{12} = $ (Variable) | | |
| $r_{13} = \infty$ (Stop) | $d_{13} = 0.65$ | | |
| $r_{14} = 17.453$ | $d_{14} = 3.50$ | $n_{d8} = 1.49700$ | $\nu_{d8} = 81.54$ |
| $r_{15} = -35.380$ | $d_{15} = 0.20$ | | |
| $r_{16} = 19.943$ (Aspheric) | $d_{16} = 3.20$ | $n_{d9} = 1.49700$ | $\nu_{d9} = 81.54$ |
| $r_{17} = -19.595$ | $d_{17} = 1.00$ | $n_{d10} = 1.80100$ | $\nu_{d10} = 34.97$ |
| $r_{18} = -170.727$ | $d_{18} = $ (Variable) | | |
| $r_{19} = 15.606$ | $d_{19} = 5.50$ | $n_{d11} = 1.49700$ | $\nu_{d11} = 81.54$ |
| $r_{20} = -20.010$ | $d_{20} = 1.00$ | $n_{d12} = 1.77250$ | $\nu_{d12} = 49.60$ |
| $r_{21} = -3292.381$ (Aspheric) | $d_{21} = $ (Variable) | | |
| $r_{22} = -11.529$ | $d_{22} = 1.50$ | $n_{d13} = 1.54814$ | $\nu_{d13} = 45.79$ |
| $r_{23} = -35.763$ | $d_{23} = 5.58$ | | |
| $r_{24} = 31.596$ | $d_{24} = 3.50$ | $n_{d14} = 1.63930$ | $\nu_{d14} = 44.87$ |
| $r_{25} = -1207.064$ (Aspheric) | $d_{25} = $ (Variable) | | |
| $r_{26} = \infty$ | $d_{26} = 2.46$ | $n_{d15} = 1.54771$ | $\nu_{d15} = 62.84$ |
| $r_{27} = \infty$ | $d_{27} = 1.00$ | $n_{d16} = 1.51633$ | $\nu_{d16} = 64.14$ |
| $r_{28} = \infty$ | $d_{28} = 0.50$ | | |
| $r_{29} = \infty$ | $d_{29} = 0.70$ | $n_{d17} = 1.51633$ | $\nu_{d17} = 64.14$ |
| $r_{30} = \infty$ | $d_{30} = 0.99$ | | |
| $r_{31} = \infty$ (Imaging Plane) | | | |

Aspherical Coefficients

6th surface

K = 0.000
$A_4 = 7.34440 \times 10^{-6}$
$A_6 = -5.47600 \times 10^{-8}$
$A_8 = 4.46078 \times 10^{-10}$
$A_{10} = -1.38040 \times 10^{-12}$ 16th surface K = 0.000
$A_4 = -3.25911 \times 10^{-5}$
$A_6 = -2.24817 \times 10^{-9}$ Aspherical Coefficients $A_8 = -1.97658 \times 10^{-9}$
$A_{10} = 9.98600 \times 10^{-12}$ 21st surface K = 0.000
$A_4 = 6.35320 \times 10^{-5}$
$A_6 = -3.26695 \times 10^{-8}$
$A_8 = 3.48949 \times 10^{-10}$
$A_{10} = 5.73630 \times 10^{-13}$ 25th surface K = 0.000
$A_4 = -1.33790 \times 10^{-6}$
$A_6 = -6.81344 \times 10^{-8}$
$A_8 = 5.84722 \times 10^{-10}$
$A_{10} = -2.06452 \times 10^{-12}$ Zooming Data (∞)

| | WE | ST | TE |
|---|---|---|---|
| f (mm) | 14.871 | 33.685 | 74.184 |
| $F_{NO}$ | 3.50 | 4.00 | 4.50 |
| $d_5$ | 1.00 | 10.96 | 28.03 |
| $d_{12}$ | 11.15 | 3.93 | 1.00 |
| $d_{18}$ | 11.13 | 8.95 | 8.58 |
| $d_{21}$ | 4.10 | 8.92 | 11.19 |
| $d_{25}$ | 1.00 | 12.55 | 14.96 |
| $\phi_s$ | 9.78 | 11.48 | 11.02 |

Example 2

| | | | |
|---|---|---|---|
| $r_1 = 89.831$ | $d_1 = 2.60$ | $n_{d1} = 1.84666$ | $\nu_{d1} = 23.78$ |
| $r_2 = 63.969$ | $d_2 = 0.00$ | | |
| $r_3 = 64.105$ | $d_3 = 9.17$ | $n_{d2} = 1.49700$ | $\nu_{d2} = 81.54$ |
| $r_4 = 479.847$ | $d_4 = 0.20$ | | |
| $r_5 = 75.241$ | $d_5 = 6.43$ | $n_{d3} = 1.60311$ | $\nu_{d3} = 60.64$ |
| $r_6 = 342.992$ | $d_6 = $ (Variable) | | |
| $r_7 = 959.971$ | $d_7 = 1.80$ | $n_{d4} = 1.81600$ | $\nu_{d4} = 46.62$ |
| $r_8 = 18.842$ | $d_8 = 5.38$ | | |
| $r_9 = -472.524$ | $d_9 = 1.10$ | $n_{d5} = 1.73400$ | $\nu_{d5} = 51.47$ |
| $r_{10} = 28.939$ | $d_{10} = 5.91$ | | |
| $r_{11} = -29.210$ | $d_{11} = 1.20$ | $n_{d6} = 1.71300$ | $\nu_{d6} = 53.87$ |
| $r_{12} = 100.546$ | $d_{12} = 0.15$ | | |
| $r_{13} = 49.322$ | $d_{13} = 7.57$ | $n_{d7} = 1.63980$ | $\nu_{d7} = 34.46$ |
| $r_{14} = -24.681$ (Aspheric) | $d_{14} = $ (Variable) | | |
| $r_{15} = 1133.429$ | $d_{15} = 1.20$ | $n_{d8} = 1.78472$ | $\nu_{d8} = 25.68$ |
| $r_{16} = 106.597$ | $d_{16} = 0.25$ | | |
| $r_{17} = \infty$ (Stop) | $d_{17} = $ (Variable) | | |
| $r_{18} = 20.155$ (Aspheric) | $d_{18} = 5.10$ | $n_{d9} = 1.49700$ | $\nu_{d9} = 81.54$ |
| $r_{19} = -94.742$ | $d_{19} = 0.18$ | | |
| $r_{20} = 36.005$ | $d_{20} = 1.14$ | $n_{d10} = 1.80440$ | $\nu_{d10} = 39.59$ |
| $r_{21} = 13.506$ | $d_{21} = 5.53$ | $n_{d11} = 1.60311$ | $\nu_{d11} = 60.64$ |
| $r_{22} = -1129.492$ | $d_{22} = $ (Variable) | | |
| $r_{23} = -72.560$ | $d_{23} = 0.90$ | $n_{d12} = 1.51633$ | $\nu_{d12} = 64.14$ |
| $r_{24} = 11.805$ | $d_{24} = 2.93$ | $n_{d13} = 1.84666$ | $\nu_{d13} = 23.78$ |
| $r_{25} = 16.801$ | $d_{25} = $ (Variable) | | |
| $r_{26} = 91.913$ | $d_{26} = 2.97$ | $n_{d14} = 1.49700$ | $\nu_{d14} = 81.54$ |
| $r_{27} = -29.023$ (Aspheric) | $d_{27} = 0.15$ | | |
| $r_{28} = 48.863$ | $d_{28} = 5.10$ | $n_{d15} = 1.60311$ | $\nu_{d15} = 60.64$ |
| $r_{29} = -13.320$ | $d_{29} = 0.85$ | $n_{d16} = 1.84666$ | $\nu_{d16} = 23.78$ |
| $r_{30} = -48.001$ | $d_{30} = $ (Variable) | | |
| $r_{31} = \infty$ | $d_{31} = 16.00$ | $n_{d17} = 1.51633$ | $\nu_{d17} = 64.14$ |
| $r_{32} = \infty$ | $d_{32} = 1.00$ | | |
| $r_{33} = \infty$ | $d_{33} = 2.60$ | $n_{d18} = 1.54771$ | $\nu_{d18} = 62.84$ |
| $r_{34} = \infty$ | $d_{34} = 1.00$ | | |
| $r_{35} = \infty$ | $d_{35} = 0.75$ | $n_{d19} = 1.51633$ | $\nu_{d19} = 64.14$ |

Example 2-continued

| | |
|---|---|
| $r_{36} = \infty$ | $d_{36} = 1.24$ |
| $r_{37} = \infty$ | |
| (Imaging Plane) | |

Aspherical Coefficients

14th surface

K = 0.000
$A_4 = -8.95501 \times 10^{-9}$
$A_6 = 8.47476 \times 10^{-9}$
$A_8 = 1.67607 \times 10^{-11}$
$A_{10} = 0$ 18th surface K = 0.000
$A_4 = -1.75923 \times 10^{-5}$
$A_6 = 4.44554 \times 10^{-9}$
$A_8 = -1.34515 \times 10^{-10}$
$A_{10} = 0$ 27th surface K = 0.000
$A_4 = -1.47160 \times 10^{-6}$
$A_6 = 1.54417 \times 10^{-9}$
$A_8 = -2.36290 \times 10^{-10}$
$A_{10} = 0$ Zooming Data (∞)

| | WE | ST | TE |
|---|---|---|---|
| f (mm) | 7.338 | 23.289 | 74.688 |
| $F_{NO}$ | 2.80 | 3.50 | 3.50 |
| $d_6$ | 1.36 | 31.07 | 61.33 |
| $d_{14}$ | 54.26 | 11.10 | 1.70 |
| $d_{17}$ | 17.42 | 8.86 | 1.03 |
| $d_{22}$ | 1.50 | 6.86 | 16.90 |
| $d_{25}$ | 6.86 | 6.18 | 6.82 |
| $d_{30}$ | 4.46 | 8.38 | 5.36 |
| $\varnothing_s$ | 9.95 | 10.11 | 13.64 |

EXAMPLE 3

| | | | |
|---|---|---|---|
| $r_1 = 98.486$ | $d_1 = 1.70$ | $n_{d1} = 1.80518$ | $v_{d1} = 25.42$ |
| $r_2 = 48.098$ | $d_2 = 9.50$ | $n_{d2} = 1.49700$ | $v_{d2} = 81.54$ |
| $r_3 = -449.337$ | $d_3 = 0.10$ | | |
| $r_4 = 41.194$ | $d_4 = 5.95$ | $n_{d3} = 1.71300$ | $v_{d3} = 53.87$ |
| $r_5 = 118.580$ | $d_5 = $ (Variable) | | |
| $r_6 = 41.612$ (Aspheric) | $d_6 = 1.50$ | $n_{d4} = 1.72916$ | $v_{d4} = 54.68$ |
| $r_7 = 10.021$ | $d_7 = 5.66$ | | |
| $r_8 = -21.370$ | $d_8 = 0.70$ | $n_{d5} = 1.77250$ | $v_{d5} = 49.60$ |
| $r_9 = 31.263$ | $d_9 = 0.10$ | | |
| $r_{10} = 25.595$ | $d_{10} = 3.55$ | $n_{d6} = 1.84666$ | $v_{d6} = 23.78$ |
| $r_{11} = -23.685$ | $d_{11} = 1.08$ | | |
| $r_{12} = -16.841$ | $d_{12} = 0.70$ | $n_{d7} = 1.77250$ | $v_{d7} = 49.60$ |
| $r_{13} = -3028.008$ | $d_{13} = $ (Variable) | | |
| $r_{14} = \infty$ (Stop) | $d_{14} = 0.60$ | | |
| $r_{15} = 17.225$ | $d_{15} = 2.75$ | $n_{d8} = 1.61772$ | $v_{d8} = 49.81$ |
| $r_{16} = -9104.928$ | $d_{16} = 6.41$ | | |
| $r_{17} = 27.817$ (Aspheric) | $d_{17} = 5.00$ | $n_{d9} = 1.49700$ | $v_{d9} = 81.54$ |
| $r_{18} = -14.018$ | $d_{18} = 0.55$ | $n_{d10} = 1.80518$ | $v_{d10} = 25.42$ |
| $r_{19} = -33.314$ | $d_{19} = $ (Variable) | | |
| $r_{20} = 352.923$ | $d_{20} = 4.20$ | $n_{d11} = 1.48749$ | $v_{d11} = 70.23$ |
| $r_{21} = -19.723$ | $d_{21} = 13.68$ | $n_{d12} = 1.80100$ | $v_{d12} = 34.97$ |
| $r_{22} = -27.952$ (Aspheric) | $d_{22} = $ (Variable) | | |

EXAMPLE 3-continued

| | | | |
|---|---|---|---|
| $r_{23} = -24.739$ | $d_{23} = 1.40$ | $n_{d13} = 1.80100$ | $v_{d13} = 34.97$ |
| $r_{24} = 37.589$ | $d_{24} = 3.25$ | $n_{d14} = 1.84666$ | $v_{d14} = 23.78$ |
| $r_{25} = -157.090$ | $d_{25} = 0.10$ | | |
| $r_{26} = 43.407$ | $d_{26} = 3.75$ | | |
| $r_{27} = -93.811$ (Aspheric) | $d_{27} = $ (Variable) | $n_{d15} = 1.49700$ | $v_{d15} = 81.54$ |
| $r_{28} = \infty$ | $d_{28} = 2.46$ | $n_{d16} = 1.54771$ | $v_{d16} = 62.84$ |
| $r_{29} = \infty$ | $d_{29} = 1.00$ | $n_{d17} = 1.51633$ | $v_{d17} = 64.14$ |
| $r_{30} = \infty$ | $d_{30} = 0.50$ | | |
| $r_{31} = \infty$ | $d_{31} = 0.70$ | $n_{d18} = 1.51633$ | $v_{d18} = 64.14$ |
| $r_{32} = \infty$ | $d_{32} = 1.22$ | | |
| $r_{33} = \infty$ | | | |
| (Imaging Plane) | | | |

Aspherical Coefficients

6th surface

K = 0.000
$A_4 = 1.02356 \times 10^{-5}$
$A_6 = 2.95186 \times 10^{-9}$
$A_8 = -2.21364 \times 10^{-10}$
$A_{10} = 1.05286 \times 10^{-12}$ 17th surface K = 0.000
$A_4 = -4.67672 \times 10^{-5}$
$A_6 = -1.30812 \times 10^{-7}$
$A_8 = 4.52729 \times 10^{-10}$
$A_{10} = -2.21549 \times 10^{-11}$ 22nd surface K = 0.000
$A_4 = 2.27047 \times 10^{-5}$
$A_6 = -1.28307 \times 10^{-8}$
$A_8 = 4.31712 \times 10^{-11}$
$A_{10} = -9.83443 \times 10^{-14}$ 27th surface K = 0.000
$A_4 = -4.11040 \times 10^{-5}$
$A_6 = 1.18570 \times 10^{-7}$
$A_8 = -2.52218 \times 10^{-10}$
$A_{10} = 2.96812 \times 10^{-13}$ Zooming Data (∞)

| | WE | ST | TE |
|---|---|---|---|
| f (mm) | 14.360 | 40.000 | 139.500 |
| $F_{NO}$ | 3.52 | 4.37 | 4.46 |
| $d_5$ | 0.97 | 15.78 | 40.00 |
| $d_{13}$ | 15.40 | 5.61 | 1.21 |
| $d_{19}$ | 1.00 | 10.90 | 26.60 |
| $d_{22}$ | 11.17 | 8.68 | 3.48 |
| $d_{27}$ | 2.20 | 19.88 | 8.56 |
| $\varnothing_s$ | 10.0 | 10.5 | 11.4 |

As can be seen understood from the foregoing, the present invention can provide an electronic image pickup system that enables a wide image-pickup range without recourse to any conversion lens, and ensures that even when an image obtained by photographing a landscape or the like having a high spatial frequency is enlarged and printed to appreciation size, sufficient image quality and clearness are obtained from the center to as far as the margin of the image and the image of a subject is depicted with a sense of extension.

What we claim is:

1. An image pickup system comprising an image-formation optical system for forming an image of a subject and an electronic image pickup device located on an image side of said image-formation optical system for obtaining image information on said image, wherein:

an angle between the farthest-off-axis chief ray incident on the farthest off-axis site on an image pickup plane of said electronic image pickup device and an axial chief ray incident on the center of said image pickup plane satisfies the following conditions (1) and (2), and said image pickup device satisfies the following condition (3):

$$36° < \omega_{w1} < 60° \tag{1}$$

$$-15 \leq \omega_{w0} < 10° \tag{2}$$

$$3.5 < N < 20 \text{ (in millions)} \tag{3}$$

where $\omega_{w1}$ is an angle between a direction of incidence of said axial chief ray and a direction of incidence of said farthest-off-axis chief ray on an entrance plane of said image-formation optical system or, alternatively, at a wide-angle end when said image-formation optical system is a zoom optical system, $\omega_{w0}$ is an angle between a direction of emergence of said axial chief ray and a direction of emergence of said farthest-off-axis chief ray on an exit plane of said image-formation optical system or, alternatively, at a wide-angle end when said image-formation optical system is a zoom optical system with the proviso that a sign for the direction of emergence of light away from an optical axis thereof is negative, and N is an effective number of pixels of said electronic image pickup device (in millions) or a maximum number of recording pixels by signal processing (in millions).

2. An image pickup system according to claim 1, wherein said image-formation optical system satisfies the following condition (4):

$$28° < \omega_{w1} + \omega_{w0} < 45° \tag{4}$$

3. An image pickup system according to claim 2, wherein an image pickup plane of said electronic image pickup device has a diagonal length D capable of meeting the following condition (5):

$$5 \text{ mm} < D < 30 \text{ mm} \tag{5}$$

4. An image pickup system according to claim 2, wherein said image-formation optical system has an image-formation capability that satisfies the following condition (6), and said electronic image pickup device satisfies the following condition (7):

$$1.05 < \phi_w / P \times (3.5/N) < 8.0 \tag{6}$$

$$0.0015 < P < 0.008 \text{ (mm)} \tag{7}$$

where $\phi_w$ is a diameter in mm of a 90% encircled energy of a point spread function by amplitude by an optical system at an f number of F5.6 at substantially the center of an image plane and a wavelength e-line, from which a low-pass action due to an optical low-pass filter is eliminated or alternatively, a diameter of the 90% encircled energy at an wide-angle end in the case where said image-formation optical system is a zoom optical system, and P is a pixel pitch in mm of the image pickup device.

5. An image pickup system according to claim 2, wherein said image-formation optical system is a zoom lens including a wide-angle end, in which a half angle of view with respect to a subject on an infinite object point is 36° or greater.

6. An image pickup system according to claim 2, wherein said image-formation optical system is of image-formation capability satisfying the following condition (8):

$$1.5 < \phi_w / P < 8.0 \tag{8}$$

where $\phi_w$ is a diameter in mm of a 90% encircled energy of a point spread function by amplitude by an optical system at an f number of F5.6 at substantially the center of an image plane and a wavelength e-line, from which a low-pass action due to an optical low-pass filter is eliminated or, alternatively, a diameter of the 90% encircled energy at a wide-angle end in the case where said image-formation optical system is a zoom optical system, and P is a pixel pitch in mm of the image pickup device.

7. An image pickup system according to claim 1, wherein an image pickup plane of said electronic image pickup device has a diagonal length D capable of meeting the following condition (5):

$$5 \text{ mm} < D < 30 \text{ mm} \tag{5}$$

8. An image pickup system according to claim 1, wherein said image-formation optical system has an image-formation capability that satisfies the following condition (6), and said electronic image pickup device satisfies the following condition (7):

$$1.05 < \phi_w / P \times (3.5/N) < 8.0 \tag{6}$$

$$0.0015 < P < 0.008 \text{ (mm)} \tag{7}$$

where $\phi_w$ is a diameter in mm of a 90% encircled energy of a point spread function by amplitude by an optical system at an f number of F5.6 at substantially the center of an image plane and a wavelength e-line, from which a low-pass action due to an optical low-pass filter is eliminated or alternatively, a diameter of the 90% encircled energy at an wide-angle end in the case where said image-formation optical system is a zoom optical system, and P is a pixel pitch in mm of the image pickup device.

9. An image pickup system according to claim 1, wherein said image-formation optical system is a zoom lens including a wide-angle end, in which a half angle of view with respect to a subject on an infinite object point is 36° or greater.

10. An image pickup system according to claim 1, wherein said image-formation optical system is of image-formation capability satisfying the following condition (8):

$$1.5 < \varphi_w/P < 8.0 \quad (8)$$

where $\phi_w$ is a diameter in mm of a 90% encircled energy of a point spread function by amplitude by an optical system at an f number of F5.6 at substantially the center of an image plane and a wavelength e-line, from which a low-pass action due to an optical low-pass filter is eliminated or, alternatively, a diameter of the 90% encircled energy at a wide-angle end in the case where said image-formation optical system is a zoom optical system, and P is a pixel pitch in mm of the image pickup device.

11. An image pickup system comprising an image-formation optical system for forming an image of a subject and an electronic image pickup device located on an image side of said image-formation optical system for obtaining image information on said image, wherein:
an angle between the farthest-off-axis chief ray incident on the farthest oft-axis site on an image pickup plane of said electronic image pickup device and an axial chief ray incident on the center of said image pickup plane satisfies the following conditions (1), and said image pickup device satisfies the following condition (3):

$$36° < \omega_{w1} < 60° \quad (1)$$

$$3.5 < N < 20 \text{ (in millions)} \quad (3)$$

where $\omega_{w1}$ is an angle between a direction of incidence of said axial chief ray and a direction of incidence of said farthest-off-axis chief ray on an entrance plane of said image-formation optical system or, alternatively, at a wide-angle end when said image-formation optical system is a zoom optical system, and N is an effective number of pixels of said electronic image pickup device (in millions).

12. An image pickup system according to claim 11, wherein the following conditions (2) is satisfied $$-15° \leq \omega_{w0} < 10° \quad (2)$$

where $\omega_{w0}$ represents an angle between a direction of emergence of said axial chief ray and a direction of emergence of said farthest-off-axis chief ray on an exit plane of said image-formation optical system or, alternatively, at a wide-angle end when said image-formation optical system is a zoom optical system with the proviso that a sign for the direction of emergence of light away from an optical axis thereof is negative.

13. An image pickup system according to claim 12, wherein said image-formation optical system is a zoom lens including a wide-angle end, in which a half angle of view with respect to a subject on an infinite object point is 36° or greater.

14. An image pickup system according to claim 12, wherein said image-formation optical system is of image-formation capability satisfying the following condition (8):

$$1.5 < \phi_w P < 8.0 \quad (8)$$

where $\phi_w$ is a diameter in mm of a 90% encircled energy of a point spread function by amplitude by an optical system at an f number of F5.6 at substantially the center of an image plane and a wavelength e-line, from which a low-pass action due to an optical low-pass filter is eliminated or, alternatively, a diameter of the 90% encircled energy at a wide-angle end in the case where said image-formation optical system is a zoom optical system, and P is a pixel pitch in mm of the image pickup device.

15. An image pickup system according to claim 11, wherein said image-formation optical system satisfies the following condition (4):

$$28° < \omega_{w1} + \omega_{w0} < 45° \quad (4)$$

16. An image pickup system according to claim 11, wherein an image pickup plane of said electronic image pickup device has a diagonal length D capable of meeting the following condition (5):

$$5mm < D < 30mm. \quad (5)$$

17. An image pickup system according to claim 11, wherein said image-formation optical system has an image-formation capability that satisfies the following condition (6), and said electronic image pickup device satisfies the following condition (7):

$$1.05 < \phi_w/p \times (3.5/N) < 8.0 \quad (6)$$

$$0.0015 < P < 0.008 \text{ (mm)} \quad (7)$$

where $\phi_w$ is a diameter in mm of a 90% encircled energy of a point spread function by amplitude by an optical system at an f number of F5.6 at substantially the center of an image plane and a wavelength e-line, from which a low-pass action due to an optical low-pass filter is eliminated or alternatively, a diameter of the 90% encircled energy at an wide-angle end in the case where said image-formation optical system is a zoom optical system, and P is a pixel pitch in mm of the image pickup device.

* * * * *

UNITED STATES PATENT AND TRADEMARK OFFICE
CERTIFICATE OF CORRECTION

PATENT NO. : 7,136,230 B2
APPLICATION NO. : 10/050881
DATED : November 14, 2006
INVENTOR(S) : Yuji Miyauchi et al.

It is certified that error appears in the above-identified patent and that said Letters Patent is hereby corrected as shown below:

Column 14, line 23, change "$\omega_w = 0.012mm$" to --$\phi_w = 0.012mm$--;

Column 14, line 25, change "$\omega_w/PX \sqrt{(3.5/N)} = 2.947$" to --$\phi_w/PX \sqrt{(3.5/N)} = 2.947$--;

Column 14, line 27, change "$\omega_w/P = 4$" to --$\phi_w/P = 4$--;

Column 14, line 66, change "... gin each example" to --... in each example--;

Column 15, line 23, change "$r_1 = 8.670$" to --$r_1 = 78.670$--;

Column 19, line 18, change " $-15 \leq \omega_{w0} < 10°$" to -- $-15° \leq \omega_{w0} < 10°$--;

Column 19, line 47, change "claim 2," to --claim 1,--;

Column 19, line 56, change "claim 2," to --claim 1,--;

Column 20, line 11, change "claim 2," to --claim 1,--;

Column 20, line 16, change "claim2," to --claim 1,--;

Column 20, line 21, change "$/P < 8.0$" to --$/P \leq 8.0$--;

Column 20, line 33, change "claim 1," to --claim 2,-- ;

Column 20, line 42, change "claim 1," to --claim 2,-- ;

Column 20, line 63, change "claim 1," to --claim 2,--;

Column 21, line 1, change "claim 1," to --claim 2,-- and

UNITED STATES PATENT AND TRADEMARK OFFICE
CERTIFICATE OF CORRECTION

PATENT NO. : 7,136,230 B2
APPLICATION NO. : 10/050881
DATED : November 14, 2006
INVENTOR(S) : Yuji Miyauchi et al.

It is certified that error appears in the above-identified patent and that said Letters Patent is hereby corrected as shown below:

Column 22, line 37, change "$1.05 < \phi w/pX \sqrt{(3.5/N)} < 8.0$" to --$1.05 < \phi w/PX \sqrt{(3.5/N)} < 8.0$--.

Signed and Sealed this

Eighth Day of May, 2007

JON W. DUDAS
*Director of the United States Patent and Trademark Office*